United States Patent [19]
Tomiyasu

[11] Patent Number: 5,491,496
[45] Date of Patent: Feb. 13, 1996

[54] DISPLAY CONTROL DEVICE FOR USE WITH FLAT-PANEL DISPLAY AND COLOR CRT DISPLAY

[75] Inventor: Yuichi Tomiyasu, Tokyo, Japan

[73] Assignee: Kabushiki Kaisha Toshiba, Kawasaki, Japan

[21] Appl. No.: 237,711

[22] Filed: May 2, 1994

Related U.S. Application Data

[63] Continuation of Ser. No. 921,749, Jul. 30, 1992, abandoned.

[30] Foreign Application Priority Data

| Jul. 31, 1991 | [JP] | Japan | 3-191436 |
| Jun. 8, 1992 | [JP] | Japan | 4-147698 |

[51] Int. Cl.⁶ .................................................. G09G 3/02
[52] U.S. Cl. .......................... 345/147; 345/3; 345/22; 345/186; 345/89
[58] Field of Search .................... 345/3, 22, 153, 345/199, 147, 89, 186, 150

[56] References Cited

U.S. PATENT DOCUMENTS

| 3,928,845 | 12/1975 | Clark . |
| 4,121,283 | 10/1978 | Walker . |
| 4,344,021 | 8/1982 | Johnston . |
| 4,399,524 | 8/1983 | Muguruma et al. . |
| 4,422,163 | 12/1983 | Oldenkamp . |
| 4,430,649 | 2/1984 | Leininger . |
| 4,454,593 | 6/1984 | Fleming et al. . |
| 4,536,856 | 8/1985 | Hiroishi . |
| 4,566,005 | 1/1986 | Apperly et al. . |
| 4,574,279 | 3/1986 | Roberts . |
| 4,611,203 | 9/1986 | Criscimagna et al. . |
| 4,628,534 | 12/1986 | Marshall . |
| 4,679,038 | 7/1987 | Bantz et al. . |
| 4,730,186 | 3/1988 | Koga et al. . |

(List continued on next page.)

FOREIGN PATENT DOCUMENTS

| 0195203 | 9/1986 | European Pat. Off. . |
| 0244978 | 11/1987 | European Pat. Off. . |
| 0281502 | 9/1988 | European Pat. Off. . |
| 0359236 | 3/1990 | European Pat. Off. . |
| 61-130984 | 6/1986 | Japan . |
| 61-221921 | 2/1987 | Japan . |
| 63-202795 | 8/1988 | Japan . |
| 2-243056 | 9/1990 | Japan . |

OTHER PUBLICATIONS

Cirrus Logic, CL–GD6420 Preliminary Data Sheet, Jan. 1992, pp. 1–63, and related documents from 1992, 95 pages and Appendices A. B. and C.
(25 pages) and Addenda of approximately 52 pages 15A Bus Adapter Design and "A Color–LCD Motherboard VGA Solution" plus a further Product Bulletin and application note of 50 pages.
EGA Wonder Advertisement, 2 pages.
IBM Enhanced Graphics Adapter, 38 pages.
Pega 2 Users' Guide, Paradise Systems, Inc. 61 pages.
Richard F. Ferraro, *Programmer's Guide to the EGA and VGA Cards*, pp. 307–308.

Primary Examiner—Curtis Kunta
Assistant Examiner—Minsun Oh
Attorney, Agent, or Firm—Finnegan, Henderson, Farabow, Garrett & Dunner

[57] ABSTRACT

In the interlocking mode, the color of the color data is converted into a brightness value by a brightness converting circuit in accordance with the value of each of R, G, B of the color data written into each color register of RAMDAC. Gradation data to be written into each register of the flat palette table is formed from the brightness value. In the non-interlocking mode, an optional gradation data irrelevant to the color data of the RAMDAC is written into each register of the flat palette table. By the switching between interlocking and non-interlocking modes, selection can be made between the monochrome gradation display which faithfully reproduces the color display screen of a CRT display and the monochrome display of an optional gradation irrelevant to the color display screen.

7 Claims, 19 Drawing Sheets

U.S. PATENT DOCUMENTS

| | | |
|---|---|---|
| 4,751,502 | 6/1988 | Ishii et al. . |
| 4,760,387 | 7/1988 | Ishii et al. . |
| 4,763,279 | 8/1988 | Kellam et al. . |
| 4,764,975 | 8/1988 | Inoue . |
| 4,769,852 | 9/1988 | Hashimoto et al. . |
| 4,772,881 | 9/1988 | Hannah ................................. 340/703 |
| 4,827,255 | 5/1989 | Ishii . |
| 4,847,788 | 7/1989 | Shimada . |
| 4,860,246 | 8/1989 | Inoue . |
| 4,901,140 | 2/1990 | Lang et al. . |
| 4,926,166 | 5/1990 | Fujisawa et al. . |
| 4,980,678 | 12/1990 | Zenda ..................................... 340/716 |
| 4,990,902 | 2/1991 | Zenda . |
| 4,990,904 | 2/1991 | Zenda . |
| 4,998,099 | 3/1991 | Ishii . |
| 4,998,100 | 3/1991 | Ishii ..................................... 340/784 J |
| 5,068,649 | 11/1991 | Garrett . |
| 5,111,190 | 5/1992 | Zenda . |
| 5,122,783 | 6/1992 | Bassetti, Jr. . |
| 5,170,152 | 12/1992 | Taylor ..................................... 345/153 |
| 5,222,206 | 6/1993 | Liao . |

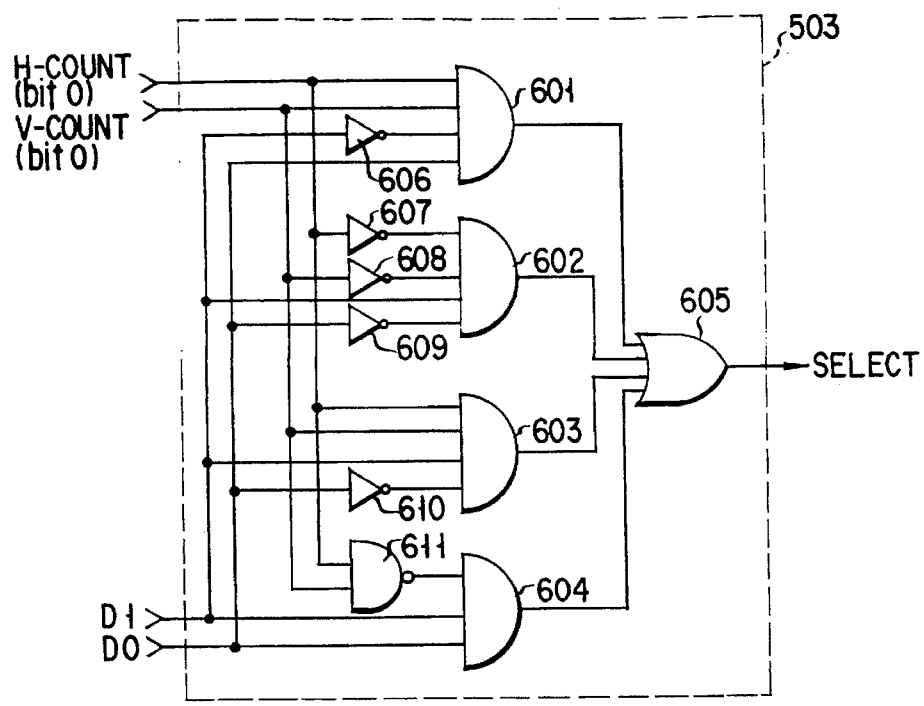
F I G. 15
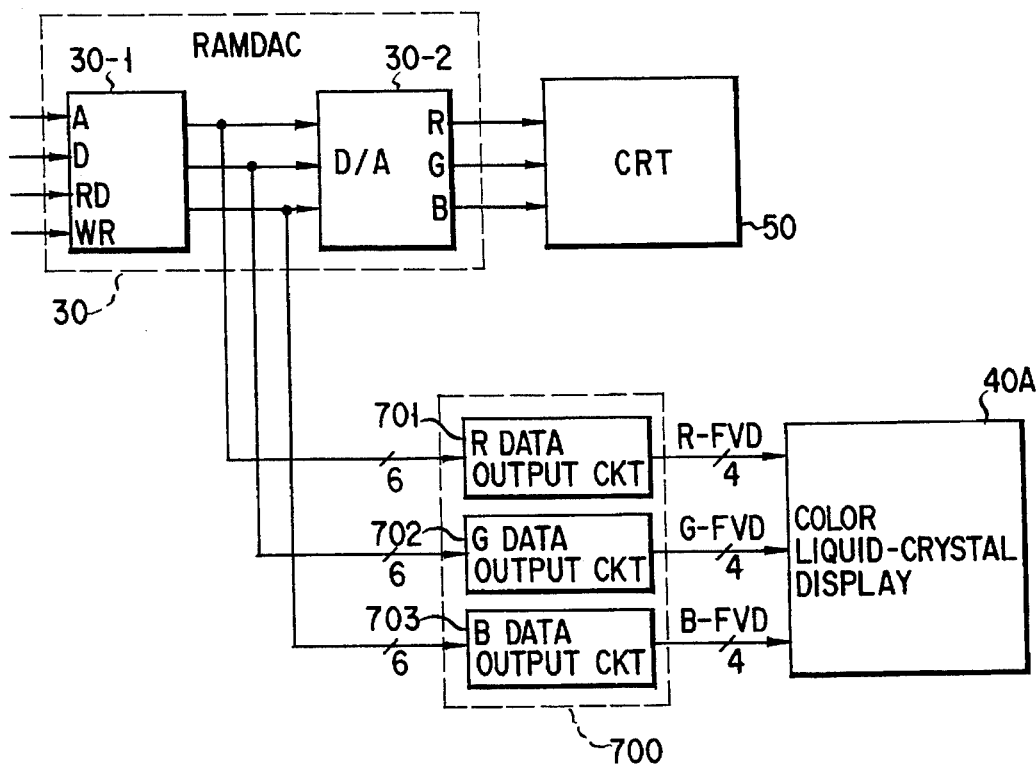
F I G. 16

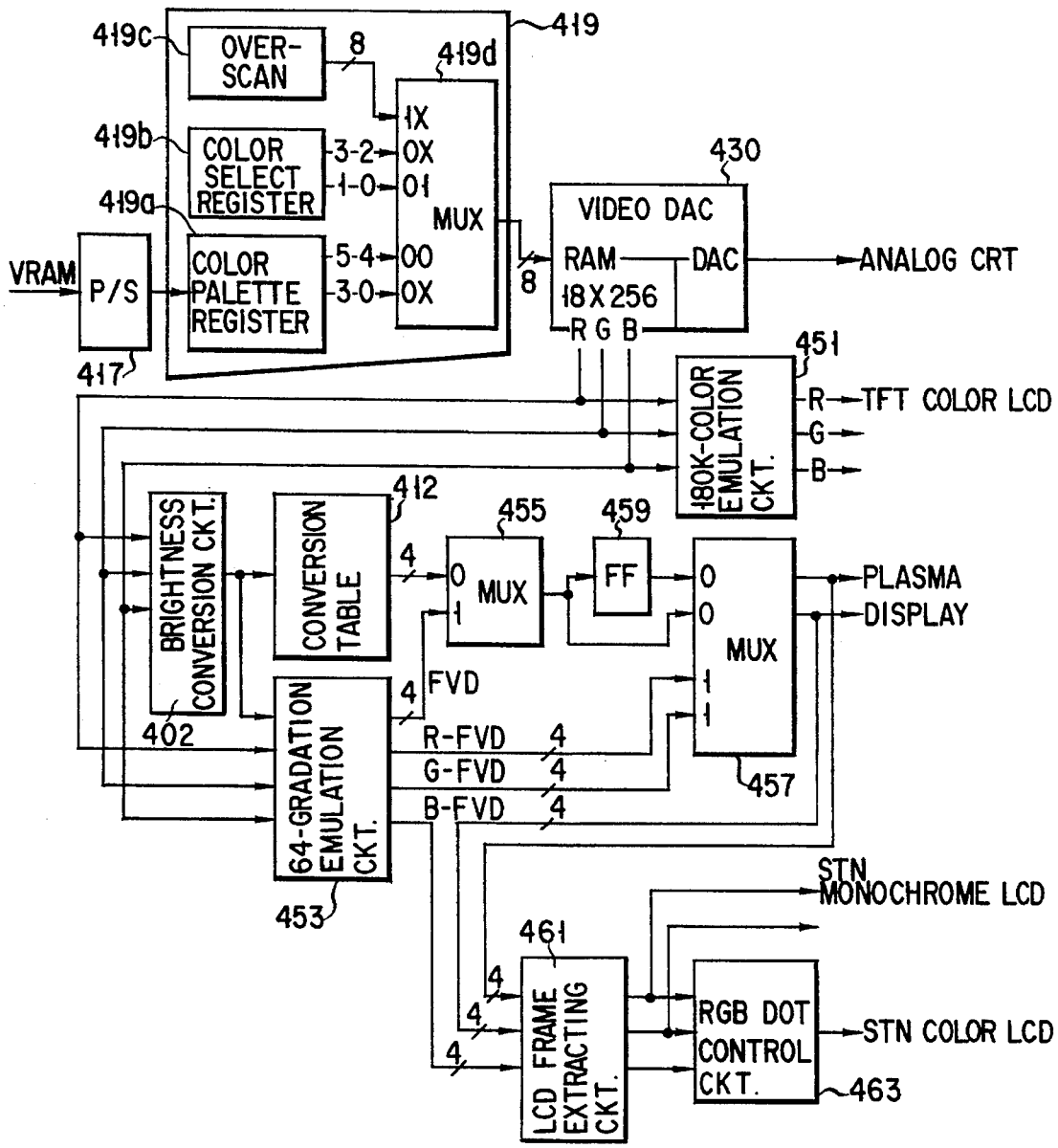
F I G. 20

DISPLAY CONTROL DEVICE FOR USE WITH FLAT-PANEL DISPLAY AND COLOR CRT DISPLAY

This application is a continuation, of application Ser. No. 07/921,749, filed Jul. 30, 1992, now abandoned.

BACKGROUND OF THE INVENTION

1. Field of the Invention

The present invention relates to a display control device and, more particularly, to a display control device for a portable computer which is adaptable to both a color CRT display and a flat-panel display.

2. Description of the Related Art

Various laptop or notebook types of portable computers have been developed recently.

Each of such portable computers is equipped with a flat-panel display such as a plasma display or a liquid-crystal display. The flat-panel display is mounted on a computer body so that it can be rotated between its closed position and its open position. The flat-panel display is designed to, in its closed position, cover a keyboard formed integral with the computer body. Thus, the computer is easy to carry. For this reason, the flat-panel display is suitable for portable computers in improving their portability. Most of flat-panel displays used with portable computers are displays for monochrome gradation display. The monochrome gradation flat-panel displays represent colors in black, white, and shades of gray, and thus are very inexpensive as compared with color flat-panel displays.

Recent portable computers, on which monochrome or color flat-panel displays are standard, are each quipped with video output terminals so that they can be connected with a color CRT display as required. Color CRT displays have been widely used as monitors for desktop personal computers. For this reason, a large number of application programs have been developed for color CRT displays. Therefore, a portable computer that can use a color CRT display permits effective utilization of existing software resources and thus can make the same practical applications as a desktop personal computer.

A flat-panel display and a color CRT display require their respective individual display control. In the case of a monochrome flat-panel display in particular, it is required to convert display data with color information for color CRT displays to monochrome gradation video data.

For this reason, a display control device for use in a portable computer equipped with a monochrome flat-panel display is equipped with a RAMDAC (color-table-equipped digital converter) for converting display data with color information to color video signals for a color CRT display and a flat-palette table for converting the display data to monochrome gradation video data for the monochrome flat-panel display.

The RAMDAC is arranged to convert display data with color information to R, G, and B analog color video signals and has,, for example, 256 color registers. In each of the color registers, R, G, and B color data are stored. The flat-palette table is adapted to convert display data with color information to monochrome gradation video data and has as many gradation registers as there are color registers in the RAMDAC color table, i.e., 256 gradation registers. In each of the gradation registers gradation data indicating a gradation (black, white, or a shade of gray) is stored.

In making a color display on a color CRT display, color-information-carrying display data of, for example, eight bits per pixel is applied to the RAMDAC as an index, whereby one of 256 color registers in the RAMDAC is selected. R, G, and B color data stored in the selected color register are converted to R, G, and B analog color video signals by respective individual digital-to-analog converters for application to the color CRT display. In making a monochrome display on a flat-panel display, on the other hand, the flat-palette table is referred to by the same display data of eight bits per pixel as is used for selecting among color registers in the RAMDAC, so that one of the 256 gradation registers is selected. The gradation data stored in the selected gradation register is applied to the flat-panel display as monochrome gradation video data.

As described above, the prior art display control device converts display data having color information originally intended for a color CRT display to gradation video data through the flat-palette table, thereby realizing monochrome gradation display on a flat-panel display. In this case, tones of monochrome gradation display on the flat-panel display are determined by values of gradation data set in the gradation registers in the flat-panel table. In order to reproduce tones of a color display on a color CRT display with a monochrome gradation display on a flat-panel display, therefore, it is necessary to generate monochrome gradation data associated with color data set in the RAMDAC and set them in the flat-panel table.

In general, the number of bits of a piece of gradation data to be set in the flat-pellet table is smaller than the number of bits of a piece of color data to be set in the RAMDAC. The reason is that the flat-panel display is small in the number of gradations per dot that can be reproduced because of panel's characteristics, and, for example, up to 16 gradations can be reproduced. For this reason, the prior art display control device uses a technique of simply thinning bits of each piece of color data set in the RAMDAC for linear conversion from color data to gradation data.

However, in the process of converting color data to gradation data, no consideration is given to the human visual sense of colors in which the sensitivity to lightness increases in the order of blue, red, and green. Thus, if gradation data prepared by using the above-mentioned linear conversion technique are used, then tones of a monochrome display on the flat-panel display will look different from those of a color display on the color CRT display. That is, the monochrome flat-panel display cannot faithfully reproduce tones of color display that can be displayed on a color CRT display.

In the prior art, monochrome gradation data is always generated utilizing color data in the RAMDAC as described above. Thus, it is impossible to generate any gradation data that is not associated with color data in the RAMDAC and display it on a flat-panel display. For example, depending upon application programs to be executed, if a color display image, as a whole, assumes, for example, greenish color, a monochrome display image may become difficult to visually recognize. For, color data in the RAMDAC are originally prepared for color CRT displays that can reproduce a large number of colors, and hence it is difficult to reproduce delicate changes in color on a flat-panel display having a limited number of reproducable gradations.

Moreover, in the prior art, in order to support monochrome gradation display on a flat-panel display, it is required to install a flat-palette table with as many as 256 gradation registers. This will result in complication of the hardware configuration of the display control device.

Furthermore, even color flat-panel displays, having a limited number of reproducable gradations per dot because of panel's physical characteristics, involve difficulties in faithfully reproducing tones of color display on color CRT displays and displaying as many colors as color CRT displays can.

Difficulties with the prior art display control device lie in faithfully reproducing the tones of color display of CRT displays on a flat-panel display and realizing on the flat-panel display any monochrome gradation display that is not associated with color data for CRT displays because monochrome gradation data are always produced from the color data.

SUMMARY OF THE INVENTION

It is therefore an object of the present invention to provide a display control device which permits monochrome gradation display or color display that is a faithful reproduction of tones of color display on CRT displays to be realized on a flat-panel display and, at the time of monochrome gradation display, permits selection between monochrome gradation display that is a faithful reproduction of color display on CRT displays and any tone of monochrome gradation display that is not associated with the color display on CRT displays as required.

A first feature of the present invention is a display control device for use with a color CRT display and a flat-panel display which comprises: a color table having a plurality of color registers each holding R, G and B color data to be displayed on the color CRT display, one of the registers being selected by display data with color information; means for converting R, G and B color data held in the selected register to analog color video signals for application to the color CRT display; a flat palette table having a plurality of registers each holding gradation data to be displayed on the flat-panel display, one of the registers being selected by the display data with color information; means for applying gradation data held in the selected register in the flat palette table to the flat-panel display; brightness conversion means for converting a color represented by color data consisting of R, G and B data to be written into each of the color registers to brightness associated with the color; and conversion table means for converting brightness data obtained by the brightness conversion means to gradation data to be written into the flat palette table.

In this display control device, R, G and B values of color data to be written into each color register in the color table are used to convert a color tone represented by the color data to a brightness value and the resultant brightness value is used to generate gradation data to be written into the flat palette table. The brightness conversion based on R, G and B values in each piece of color data to be displayed on the CRT display permits gradation data to be generated while satisfying the human visual sense having different sensitivity to R, G and B, thereby realizing monochrome gradation display which faithfully reproduces color tones of a color display on the CRT display with the flat-panel display.

A second feature of the present invention is in that, by mode selection between the associate mode and the non-associate mode, either gradation data output from the CPU of a portable computer or gradation data output from the conversion table means can be selectively written into the flat palette table.

According to the second feature, in the associate mode, monochrome gradation display faithfully reproducing color tones of a color display on the CRT display can be realized, while, in the non-associate mode in which gradation data output from the CPU is written into the flat palette table, monochrome gradation display can be achieved in any tone to fit the type of the flat-panel display or the type of an application program to be executed.

A third feature of the present invention is a display control device for use with a color CRT display and a flat-panel display which comprises: a color table having a plurality of color registers each holding R, G and B color data to be displayed on the color CRT display, one of the registers being selected by display data with color information; means for converting R, G and B color data read from the selected register in the color table to analog color video signals for application to the color CRT display; brightness conversion means for converting a color represented by color data consisting of R, G and B color data read from the selected color register to a brightness associated with the color; and means for applying gradation data having the brightness value obtained by the brightness conversion means to the flat-panel display.

According to the third feature, color data stored in the selected register in the color table is subjected to brightness conversion, so that gradation data having a brightness associated with the color represented by the color data is generated. This gradation data satisfies the human visual sense, thus realizing monochrome gradation display which is a faithful reproduction of a color display on the CRT display with the flat-panel display. Since color data read from the selected register in the color table is directly brightness-converted to gradation data for application to the flat-panel display, there is no need for the flat palette table for holding gradation data, simplifying the hardware configuration of the display control device.

Moreover, a fourth feature of the present invention is a display control device for use with a color CRT display and a monochrome flat-panel display with $2^m$ gradations, each of the displays having a multi-color (multi-tone ?) display mode in which one pixel is composed of two or more dots, which comprises a color table having a plurality of color registers each holding one--pixel color data to be displayed on the color CRT display, one of the color registers being selected by display data with color information; means for converting R, G and B color data held in the selected register in the color table to analog color video signals for application to the color CRT display; brightness conversion means for converting R, G and B color data held in the selected color register to brightness data consisting of n (n>m) bits and associated with a color represented by the R, G and B color data; means for adding a predetermined value to first gradation data represented by the high-order m bits of the n-bit brightness data to generate second m-bit gradation data that is higher in gradation level than the first gradation data; means responsive to a select signal indicating which of the first and second gradation data is to be selected for each of dots forming one pixel in the multi-color display mode for selecting one of the first and second gradation data and applying the selected gradation data to the flat-panel display; and select signal generating means responsive to the low-order (n-m) bits of the first gradation data for selectively generating $2^{(n-m)}$ gradation patterns each indicating assignment of the first or second gradation data to each of the one-pixel forming dots and controlling the generation of the select signal in accordance with a gradation pattern generated.

According to the display control device, color data stored in a register selected in the color table is subjected to brightness conversion, thereby generating gradation data having brightness associated with a color tone represented by the color data. This permits gradation data reflecting a color tone that color data has to be obtained, realizing monochrome gradation display which is a faithful reproduction of a color display on the CRT display with the flat-panel display. Moreover, since color data stored in the selected color register is directly converted to brightness data which is, in turn, applied to the flat-panel display as gradation data, the need for the flat palette table for holding gradation table is eliminated, thus simplifying the hardware configuration of the display control device. Furthermore, gradation emulation from $2^m$ gradations to $2^m \times 2^{(n-m)}$ gradations is performed by a combination of m-bit gradation data and $2^{(n-m)}$ gradation patterns, pseudo-$2^m \times 2^{(n-m)}$-gradation display can be realized with the flat-panel display having $2^m$ gradations.

Furthermore, a fifth feature of the present invention is a display control device for use with a color CRT display and a color flat-panel display which has $2^m$ gradations for each of R, G and B, each of the CRT display and the flat-panel display having a multi-color display mode in which one pixel is composed of two or more dots for each of R, G and B, which comprises a color table having a plurality of color registers each for holding color data for one pixel to be displayed on the CRT display, one of the color registers being selected by display data with color information; means for converting R, G and B color data, each consisting of n (n >m) bits, stored in the selected register to analog color video signals for application to the color CRT display; and first, second and third video data generating means respectively connected to receive the R, G and B color data stored in the selected color register in the color table for generating R, G and B color video data for application to the color flat-panel display, each of the first, second and third video data generating means comprising means for adding a predetermined value to first color data represented by the high-order m bits of the corresponding n-bit color data in the selected color register to generate second color data which is higher in gradation level than the first color data, select means responsive to a select signal indicating which of the first and second color data is to be selected for each of the dots forming a corresponding color in the multi-color display mode for selecting one of the first and second color data for application to the flat-panel display, and select signal generating means responsive to the low-order (n-m) bits of the n-bit color data for selecting one of $2^{(n-m)}$ separate gradation patterns each indicating assignment of the first and second color data to each of the dots and controlling the generation of the select signal in accordance with the selected gradation pattern.

In this type of display control device, a combination of R, G and B color video data each consisting of m bits and four gradation patterns permits gradation emulation from $2^m$ gradations, expressed by m bits for each of R, G and B, to $2^m \times 2^{(n-m)}$ gradations. Thus, in the multi-color display mode, pseudo-$(2^m \times 2^{(n-m)})^3$-color display can be achieved by the flat-panel display.

Additional objects and advantages of the invention will be set forth in the description which follows, and in part will be obvious from the description., or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 15 illustrates a specific circuit arrangement of the select signal generating circuit of FIG. 12;

FIG. 16 is a block diagram of the color video output circuit of FIG. 12;

FIG. 20 is a block diagram of a display control device according according to a first embodiment of the present invention.

Figure 1:
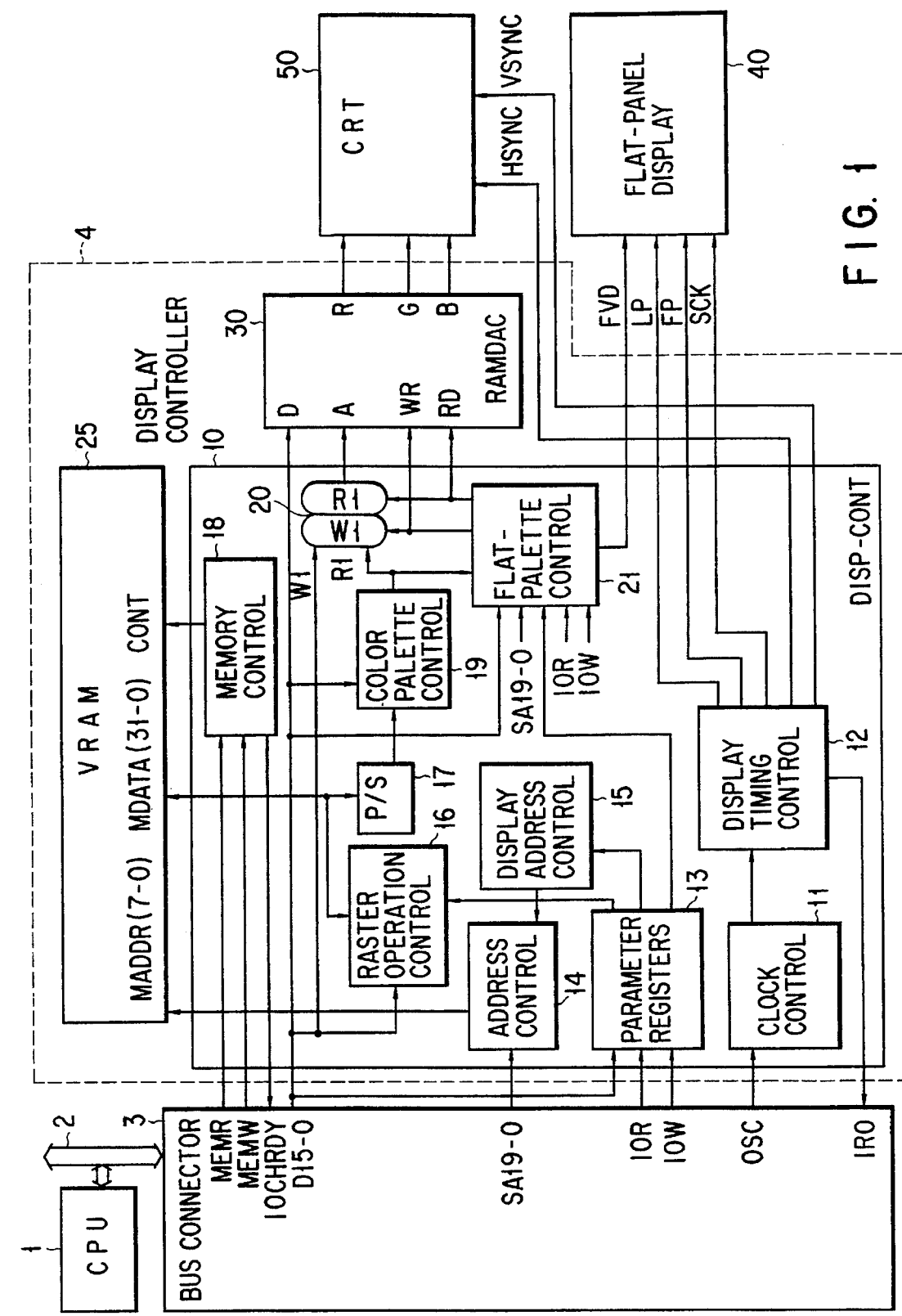
FIG. 1 is a block diagram of the whole of a display control device according to a first embodiment of the present invention.

DETAILED DESCRIPTION OF THE
PREFERRED EMBODIMENTS

First, reference will be made to FIG. 1 to describe the whole of a display control device according to a first embodiment of the present invention. This display control device 4 conforms to the VGA (Video Graphics Array) specifications and has a display mode of, for example, 640×640 dot, 16-color simultaneous display. The device is connected to a system bus 2 of a portable computer through a bus connector 3. Display control device 4 have display control of both a flat-panel display 40 that is standard on the portable computer and a color CRT display 50 that is connected to the portable computer by option.

The display control device 4 is equipped with a display controller (DISP-CONT) 10, an image memory (VRAM) 25, and a RAMDAC (color-table-equipped D/A converter) 30. The display controller, the image memory and the RAMDAC are carried on a circuit board not shown.

The display controller 10 includes an LSI comprising a gate array and constitutes the principal portion of the display control system 4. The display controller provides the interface between the display control device and a CPU 1 of the portable computer through bus connector 3 and system bus 2. Further, the display controller uses image memory 25 and RAMDAC 30 to control flat-panel display 40 and color CRT display 50.

Image memory 25 stores display data to be displayed on flat-panel display 40 or color CRT display 50 on the basis of a memory plane system with this memory plane system, a memory area is divided into two or more planes which are designated by the same address, and these planes are allocated for color information of each pixel. According to the VGA specifications, image memory 25 is comprised of four planes and thus display data for one pixel comprises a total of four bits, i,e., one bit for each plane. The data input/output port of image memory 25 is 32 bits in length, and data are input or output in units of eight bits for each plane. Therefore, display data of eight pixels are read from image memory 25 with each read access.

RAMDAC 30 is adapted to generate R, G and B analog color video signals for color CRT display 50 and comprises a color table using data applied to its address input (A) as an index and a D/A converter for converting color data read from the color table to an analog signal. The VGA specifications include a mode for simultaneous display of 256 colors with 320×200 dots. To support this display mode, the color table contains 256 color registers. In each color register is stored color data with a total of 18 bits, six bits for each of R, G and B. Color data stored in a color register selected are applied to CRT display 50 after being converted to analog R, G, and B signals by the D/A converter. Individual values of color data set in the color table are determined by write data supplied by CPU 1 to a data input (D) of RAMDAC 30.

Display controller 10 is constructed, as shown, from a clock control circuit 11, a display timing control circuit 12, a parameter register group 13, an address control circuit 14, a display address control circuit 15, a raster operation circuit 16, a parallel-to-serial conversion circuit (P/S) 17, a memory control circuit 18, a color palette control circuit 19, a multiplexer 20, and a flat-palette control circuit 21. These circuit components have the following functions.

Clock control circuit 11 and display timing control circuit 12 are adapted to control the display timing of flat-panel display 40 and CRT display 50 and produce various control signals (line pulses LP, field pulses FP, and shift clocks SCK) for controlling the display timing of flat-panel display 40 and various control signals (a horizontal sync signal HSYNC and a vertical sync signal VSYNC) for controlling the display timing of CRT display 50. The line pulse LP and the field pulse FP define the scan period for each display line and the scan period for each field, respectively, in flat-panel display 40; they correspond to a horizontal sync signal HSYC and a vertical sync signal VSYC, respectively, in CRT display 50. The shift clock SCK is used as a data shift signal for feeding a flat-panel video signal FVD into flat-panel display 40. Display timing control circuit 12 issues an interruption request signal (IRQ) to CPU 11.

Parameter register group 13 holds various parameters for defining display modes of flat-panel display 40 and CRT display 50. The parameters are provided by CPU 1 over a data bus (D15-0). Reading of the parameters from and writing of them into parameter registers 13 are controlled by an I/O read signal (I/O R) and an I/O write signal (I/O W), respectively.

Address control circuit 14 generates a memory address used to make access to image memory 25 for reading therefrom or writing thereinto. In writing display data into image memory 25, an address (SA19-0) from CPU 1 is translated to a memory write address by address control circuit 14 for subsequent application to an address port (MADDR) of image memory 25. In reading display data from image memory 25, on the other hand, memory read address are sequentially applied from address control circuit 14 to the address port (MADDR) of image memory 25 under the control of display address control circuit 15. Address control circuit 14 also generates a write address W1 used when color data is written into RAMDAC 30.

Raster operation control circuit 16 has a function of writing data supplied from CPU 1 over the data bus (D15-0) into image memory 25 as display data and a function of performing various operations on display data stored in image memory 25. At the time of display, raster operation control circuit 16 performs predetermined logical operations on display data read from image memory 25 to process the data and then writes the processed data into image memory 25 again. The contents of the logical operations depend on operation parameters set in parameter register group 13.

In order to divide display data of 32 bits (corresponding to eight pixels), read from image memory 25 at one time, into pixels each of four bits, parallel-to-serial conversion circuit 17 converts 8-bit data read from each of four planes of image memory 25 to serial data.

Memory control circuit 18, which is adapted to control access to image memory 25, controls the generation of various control signals CONT (a write enable signal, an output enable signal, a row address strobe signal, a column address strobe signal, etc.). The generation of the control signals CONT is controlled by a memory read signal (MEMR) and a memory write signal (MEMW) from CPU 1. In addition, memory control circuit 18 generates an I/O channel ready signal (IOCHRDY) so as to extend a bus cycle in CPU 1.

Color palette control circuit 19, which is adapted to determine the color attribute of 4-bit-per-pixel display data output from parallel-to-serial conversion circuit 17, is equipped with 16 color palette registers selected by the 4-bit-per-pixel display data in each color pallet register there is stored 6-bit color palette data for defining the color attribute of display data. The color palette data is written into the control circuit by CPU 1 through the data bus (D15-0). The 6-bit data stored in a color palette register selected by display data and 2-bit data output from a color select register incorporated into color palette control circuit 19 are added together, so that 8-bit data is output from the color pallet control circuit.. The 8-bit data is applied to flat-palette control circuit 21 as color data and to RAMDAC 30 via address multiplexer 20 as CRT video data. The CRT video data is used as a read address R1 of RAMDAC 30.

Address multiplexer 20 selects one of the read address R1 and the write address W1 and applies it to the address input (A) of RAMDAC 30. The selection between the read address R1 and the write address W1 is controlled by a read signal (RD) and a write signal (WR) output from flat-palette control circuit 21.

Flat palette control circuit 21 generates monochrome gradation video data FVD for flat-panel display 40 and controls the read/write operation of RAMDAC 30. Values of monochrome gradation video data FVD are obtained by converting color data written into the color table of RAMDAC 30 into brightness data. The arrangement of flat palette control circuit 21, which features the present invention, will be described in detail with reference to FIGS. 2, 3 and 4.

Figure 2:
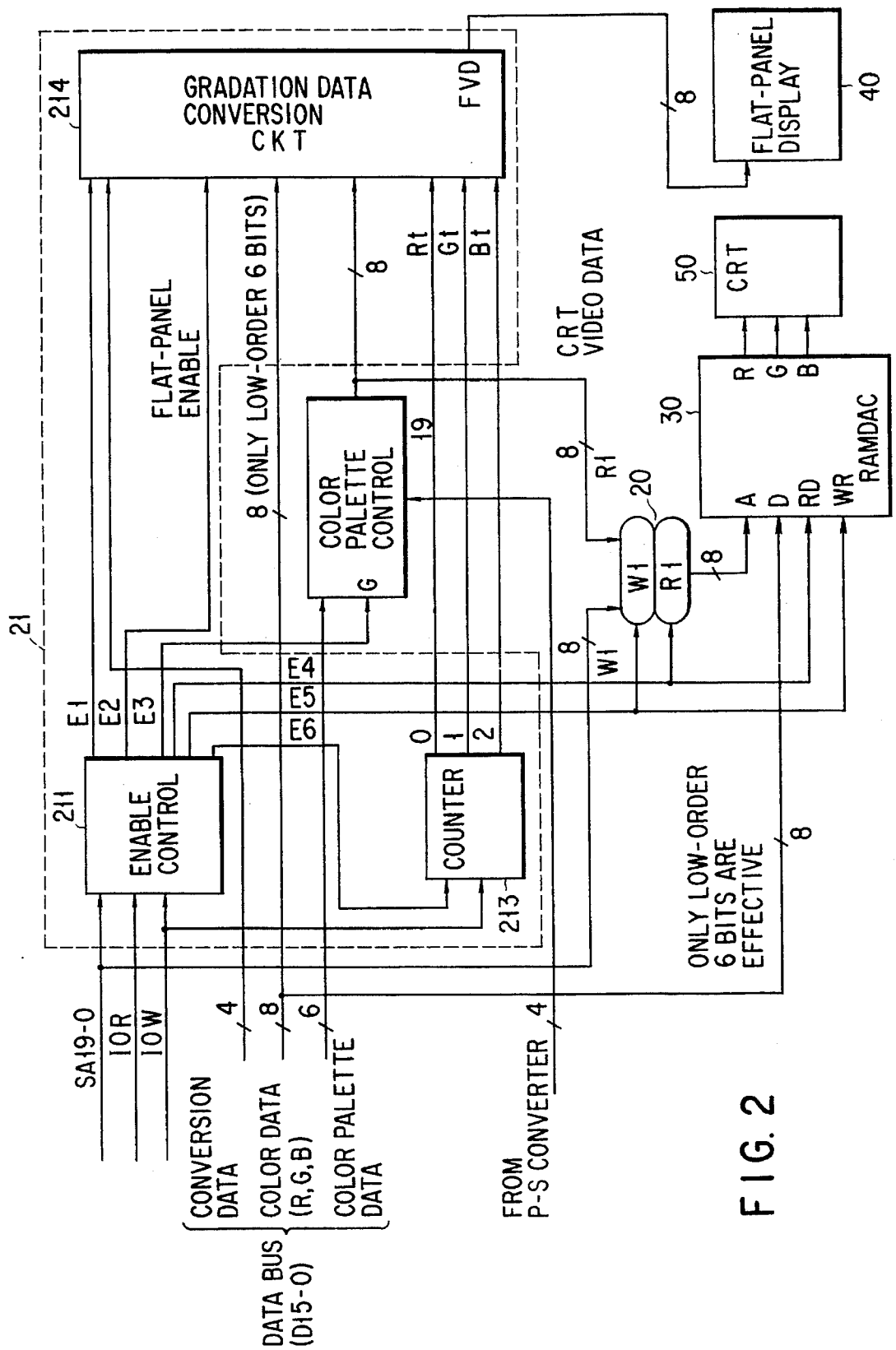
FIG. 2 is a block diagram of the flat-palette control circuit shown in FIG. 1.

In FIG. 2, there is shown a specific circuit arrangement of flat palette control circuit 21. Flat palette control circuit 21 is constructed, as shown, from an enable control circuit 211, a counter 213, and a gradation data conversion circuit 214.

Enable control circuit 211 is responsive to an address (SA19-0), an I/O read signal (IOR), and an I/O write signal (IOW) from CPU 1 to generate various enable signals E1 through E6. Enable signal E1 is an write enable signal which is rendered active when conversion data is written into a conversion table register 212, which will be described later, incorporated into gradation data conversion circuit 214. Enable signal E2 is a write enable signal which is rendered active when gradation data is written into a flat palette table, which will be described later, incorporated into gradation data conversion circuit 214. Enable signal E3 is a write enable signal which is rendered active when color palette data is written into a color palette register in color palette control circuit 19. Enable signal E4 is a read enable signal which is rendered active in reading R, G, and B analog color signals out of RAMDAC 30. Enable signal E5 is a write enable signal which is rendered active in writing R, G and B color data into RAMDAC 30. Enable signal E6 is a counter enable signal which is rendered active in causing counter 213 to start a count operation.

Counter 213 is responsive to the enable signal E6 to start to count pulses in the I/O write signal (IOW). A count in counter 213 indicates the type of color data supplied from CPU 1 when color data are written into RAMDAC 30, i.e., R, G, or B data. Here, the count "0" indicates R data, the count "1" indicates G data, and the count "2" indicates B data.

That is, in writing R, G and B color data each of 6 bits into RAMDAC 30, CPU 1 outputs color data onto the lower-order 6-bit bus lines (D5-0) of the data bus (D15-0) in the sequence of R, G, and B. In this case, the I/O write signal (IOW) is issued every time each of R, G and B data is output. For this reason, if counter 213 is counted up at the trailing edge of each pulse in the I/O write signal, the count "0" will indicate the input timing of R data, the count "1" will indicate the input timing of G data, and the count "2" will indicate the input timing of G data as shown. The count outputs of "0", "1" and "2" in counter 213 are applied to gradation data conversion circuit 214 as timing signals Rt, Gt and Bt for separating color data into its respective individual components, i.e., R, G and B data. Likewise, the timing signals Rt, Gt and Bt are also used as timing signals for writing the R, G and B data into RAMDAC 30 separately.

Gradation data conversion circuit 214 converts R, G and B data to be written into RAMDAC 30 into brightness to thereby generate gradation data corresponding to each of the R, G and B color data. A specific arrangement of gradation conversion circuit 214 is shown in FIG. 3.

Figure 3:
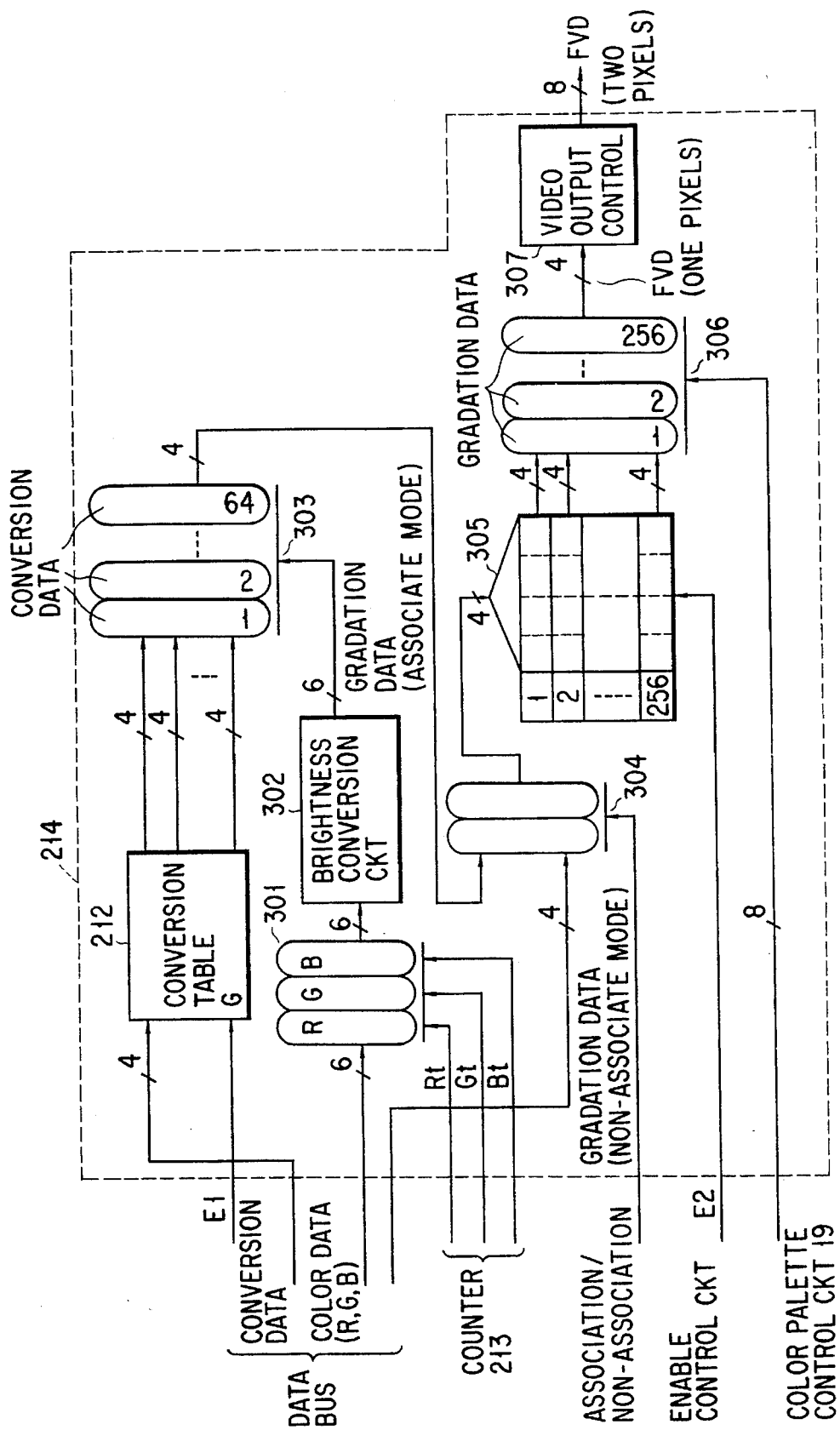
FIG. 3 is a block diagram of the gradation data conversion circuit shown in FIG. 2.

Gradation conversion circuit 214 is constructed, as shown in FIG. 3, from a conversion table 212, multiplexers 301, 303, 304 and 306, a brightness conversion circuit 302, a flat palette table 305, and a video output control circuit 307.

Conversion table 212, which is adapted to hold conversion data used in converting 6-bit brightness data, to be described later, obtained in brightness conversion circuit 302 to 4-bit gradation data, comprises 64 registers each having a width of four bits. Among the 64 registers are uniformly distributed 16 pieces of conversion data indicating respective values of 16 pieces of gradation data. For example, conversion data of value 0 are held in registers 0 to 3. Conversion data of value 1 are held in registers 4 to 7. In this fashion, conversion data of value 15 are held in registers 60 to 63. As described herein later, however, various modifications can be employed in the setting of the conversion data. Each piece of conversion data is supplied from CPU 1 to conversion table 212 via the data bus (D15-0). In this case, the low-order 4 bits on the data bus (D15-0) form each piece of conversion data. The writing of the conversion data into conversion table 212 is carried out at the time of application of the enable signal E1 that is in the active state.

Multiplexer 301 is responsive to the timing signals Rt, Gt and Bt from counter 213 to separate color data into R data, G data, and B data.

Upon receipt of the R data, G data and B data output from multiplexer 301, brightness conversion circuit 302 converts a color represented by the color data consisting of the R, G and B data to its associated brightness value. In order to obtain a brightness value conforming to the human visual sense, the brightness conversion is performed in accordance with a formula given by $$\text{brightness value}=0.30R+0.59G+0.11B \tag{1}$$

Figure 4:
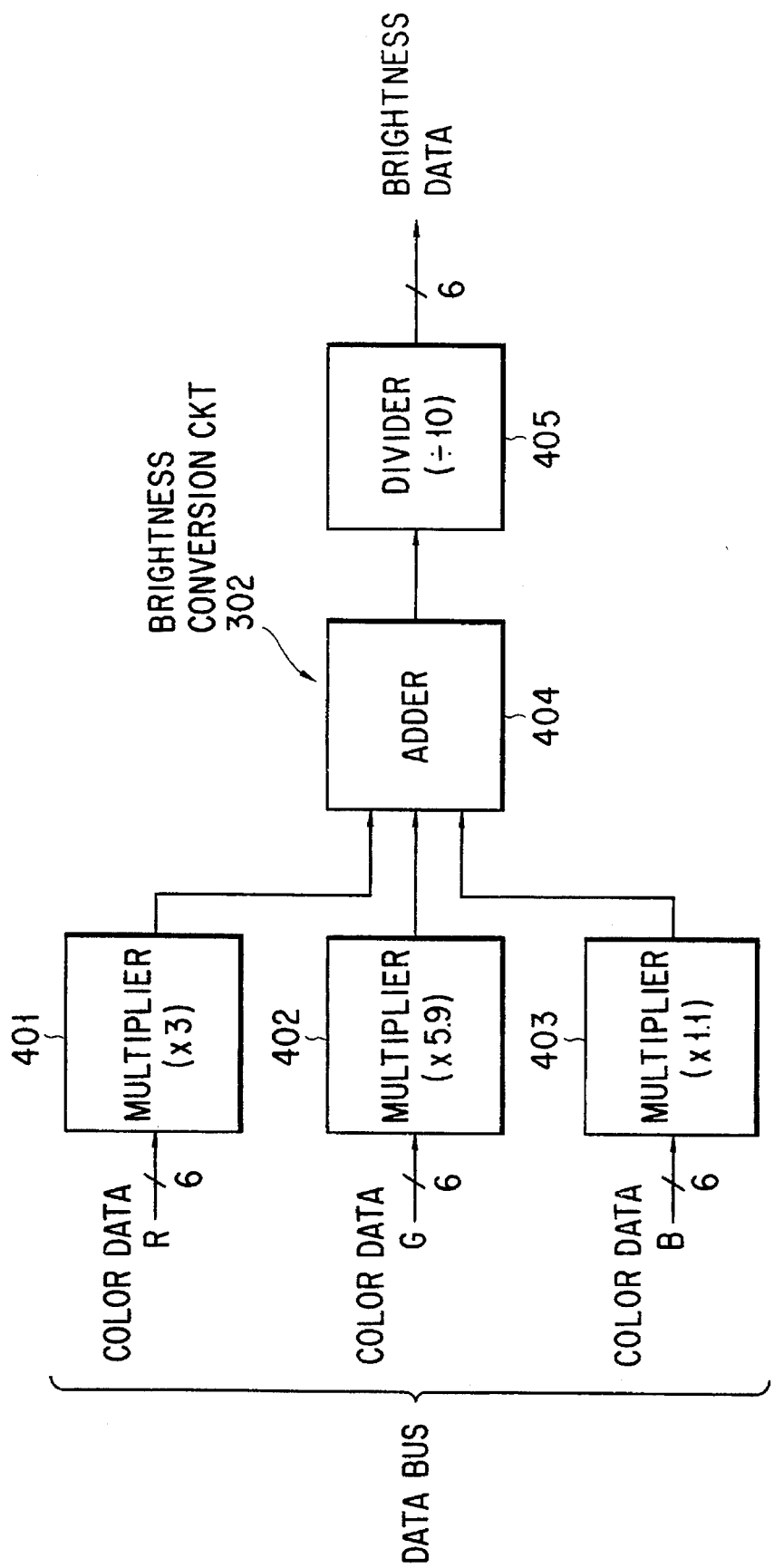
FIG. 4 is a block diagram illustrating a specific arrangement of the brightness conversion circuit of FIG. 3.

The reason why the R, G and B data are multiplied by such coefficients is that the human visual sensitivity to lightness decreases in the order green (G), red (R) and blue (B). Brightness conversion circuit 302 is constructed, as shown in FIG. 4, from first, second and third multipliers 401, 402 and 403, an adder 404, and a divider 405. First, second and third multipliers 401, 402 and 403 multiply R data, G data and B data by 3, 5.9 and 1.1, respectively. Adder 404 adds the outputs of multipliers 401, 402 and 403 together to thereby obtain 3R+5.9G+1.1B. Divider 405 divides the output of adder 404 by 10. As a result, an arithmetic operation equivalent to formula (1) is performed, thereby obtaining 6-bit brightness data.

Multiplexer 303 is responsive to the 6-bit brightness data output from brightness conversion circuit 302 to select one of the 64 registers in conversion table 212, thereby outputting 4-bit conversion data stored in the selected register. The 4-bit conversion data is applied to a first input of multiplexer 304 as gradation data. As described above, brightness data is 6 bits in length and gradation data applied to the first input of multiplexer 304 is 4 bits in length. This means that conversion from 6-bit brightness data to 4-bit gradation data was carried out by means of conversion table 212 and multiplexer 303. The multiplexer 304 selects either of the gradation data from the multiplexer 303 and the gradation data from CPU 1. The select operation of multiplexer 304 is controlled by an associate/non-associate mode specifying flag set in parameter register 13 of FIG. 1 by CPU 1. The mode specifying flag is set in accordance with a keyboard operation by a user or an instruction from an application program..

Here, the associate mode is a mode in which gradation data to be written into flat palette table 305 is generated by utilizing color data to be written into RAMDAC, while the non-associate mode is a mode in which any gradation data that is supplied from CPU 1 is written into the flat palette table as it is independently of color data to be written into RAMDAC 30. For this reason, in the associate mode, the gradation data output from multiplexer 303 is selected by multiplexer 304, while, in the non-associate mode, the gradation data output from CPU 1 is selected.

Flat palette table 305 comprises 256 registers each having a width of 4 bits. In the associate mode, gradation data output from multiplexer 303 and selected by multiplexer 304 is set in each of the 256 registers. Thereby, in the associated mode, 256 pieces of gradation data generated by utilizing 256 pieces of color data to be written into RAMDAC 30 are respectively written into the 256 registers in flat palette table 305. In the non-associate mode, on the other hand, gradation data from CPU 1 selected by multiplexer 304 are set in the 256 registers in flat palette table 305. The gradation data from CPU 1 can be changed as requested by the user or by an instruction from an application program to be executed. In the non-associate mode, therefore, any gradation data can be set independently of color data. The writing of gradation data into the 256 registers in flat palette table 305 is performed in sequence by the enable signal E2 from enable control circuit 211.

Multiplexer 306 is responsive to 8-bit color data, which is the same as CRT video data applied to RAMDAC 30 as an index, to select one of the 256 pieces of gradation data set in flat palette table 305. The selected 4-bit gradation data is output as one-pixel monochrome gradation data FVD for flat-panel display 40.

Video output control circuit 307 simultaneously outputs to flat-panel display 40 monochrome gradation data FVD (8 bits) for two pixels corresponding to the upper and lower panels of the flat-panel display.

Figure 5:
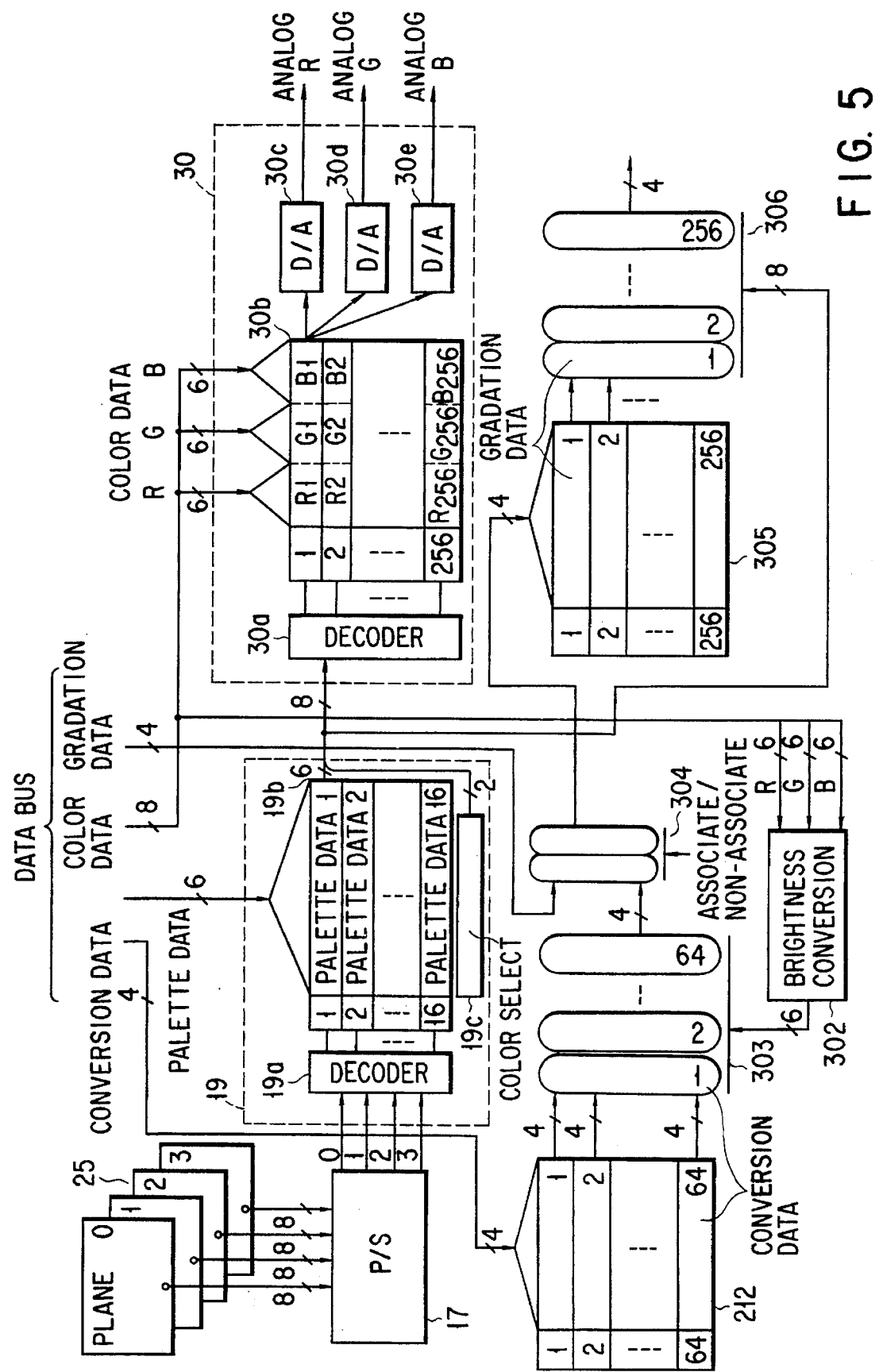
FIG. 5 is a block diagram illustrating the data flow in the display control system of FIG. 1.
Figure 6:
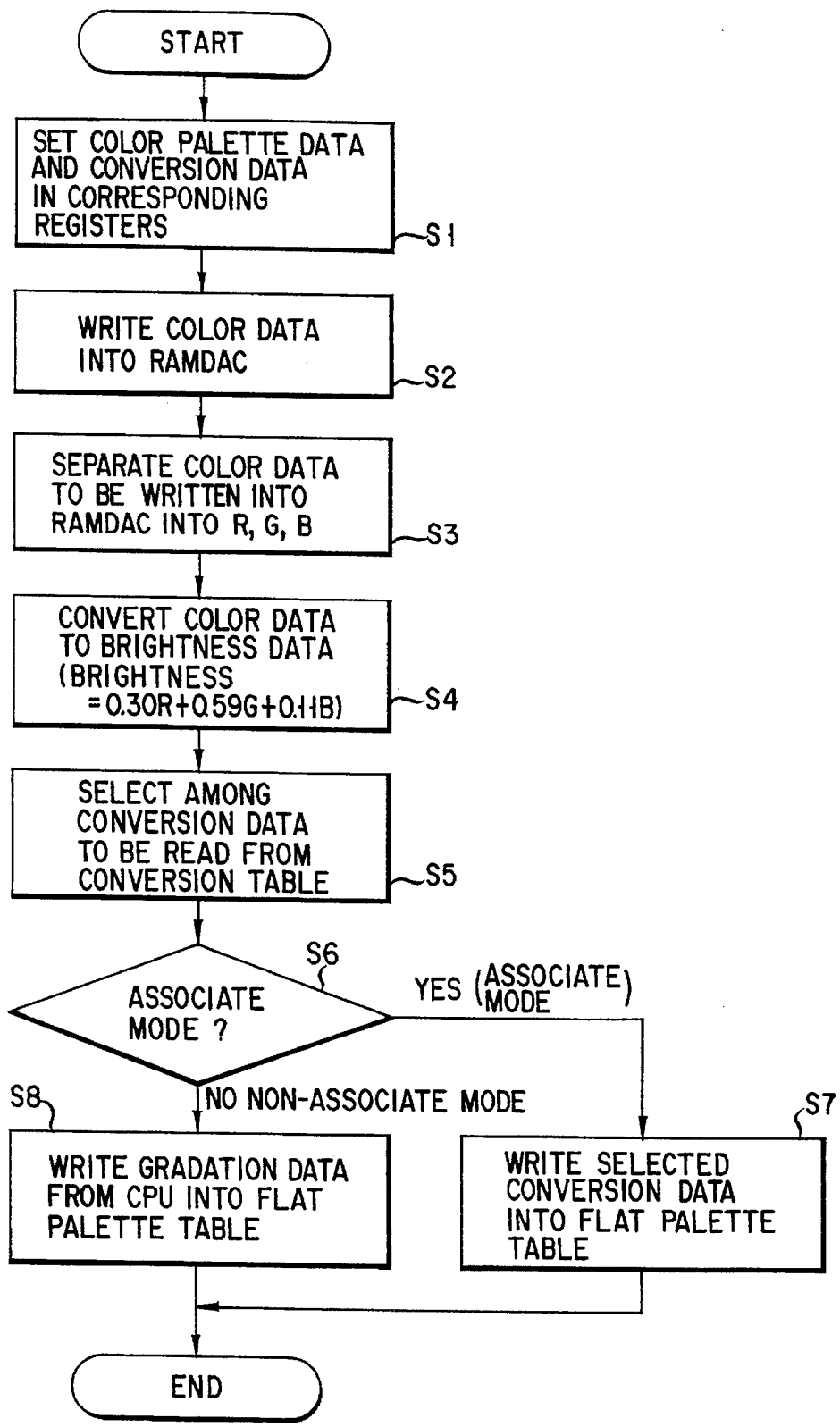
FIG. 6 is a flowchart for use in the explanation of the operation of the display control system of FIG. 1.

Next, reference will be made to FIGS. 5 and 6 to describe the generation of gradation data to be written into flat palette registers 305. FIG. 5 is a schematic illustration of portions related to the generation of gradation data, while FIG. 6 is a flowchart for the generation of the gradation data.

First, at the time of starting up of the portable computer system, CPU 1 activates a predetermined BIOS (basic input/output system) program, thereby sequentially outputting onto the data bus (D15-0) 16 pieces of palette data to be placed into the color palette registers in color palette control circuit 19 and 64 pieces of conversion data to be placed into conversion table 212. As a result, 16 pieces of color palette data, each consisting of 6 bits, are written into the 16 color palette registers 19b incorporated into color palette control circuit 19, and 64 pieces of conversion data, each consisting of 4 bits, are likewise written into the 64 registers in conversion table 212 (step S1).

Subsequently, CPU 1 outputs 256 pieces of color data to be placed into RAMDAC 30 onto the data bus (D15-0) in sequence. Thereby, 256 pieces of color data, each consisting of R, G and B data each of 6 bits, are sequentially written into 256 color table registers 30b in RAMDAC 30, respectively. Concurrently with the writing of the color data into RAMDAC 30, the process of generating the gradation data to be written into flat palette table 305 is carried out as follows.

That is, R, G and B color data, each of 6 bits, output from CPU 1 are separated by multiplexer 310 of FIG. 1 into R data, G data and B data which are, in turn, fed into brightness conversion circuit 302 (step S3). Brightness conversion circuit 302 performs a brightness conversion process according to formula (1) with the result that color data consisting of R data, G data and B data is converted to 6-bit brightness data (step S4). The 6-bit brightness data is sent to multiplexer 303 where one of 64 pieces of 4-bit conversion data set in conversion table 212 is selected (step S5). The selected 4-bit conversion data is applied to the first input of multiplexer 304.

In the case of the associate mode, that is, when the associate mode indicating flag is set in parameter register 13 of FIG. 1, multiplexer 304 selects its first input. Thus, the 4-bit conversion data read out of conversion table 212 is selected and then written into flat palette table 305 (step S7). The steps S3 through S7 are carried out in sequence for each of 256 pieces of color data to be written into RAMDAC 30. Consequently, into flat palette table 305 are written 256 pieces of gradation data associated with 256 pieces of color data to be written into color table registers 30b in RAMDAC 30.

In the case of the non-associate mode, that is, when the non-associate mode indicating flag is set in the parameter register of FIG. 1, multiplexer 304 selects its second input. In the non-associate mode, 256 pieces of gradation data each of 4 bits are sequentially supplied from CPU 1 to the second input of multiplexer 304. Thus, the gradation data are selected by multiplexer 304 and then written into flat palette table 305 in sequence (step S8).

Next, the process of outputting analog R, G and B video signals to CRT display 50 and the process of outputting of monochrome gradation video data FVD to flat panel display 40 will be described with reference to FIG. 5.

The outputting of analog R, G and B video signals is carried out as follows.

In image memory 25 having four memory planes 0–3, 8 bits are simultaneously read from storage locations of each memory plane that are designated by the same read address with the result that display data with a total of 32 bits is applied to parallel-to-serial conversion circuit 17. Parallel-to-serial conversion circuit 17 converts 8-bit parallel data from each memory plane into serial data and outputs parallel data of 4 bits each of which is read from a respective one of the four planes 0–3. The four bits that are simultaneously output from parallel-to-serial conversion circuit 17 represent display data for one pixel.

The 4-bit-per-pixel display data is entered into a decoder 19a of color palette control circuit 19 and then decoded therein. As a result of decoding of the display data, one of 16 color palette registers 19b in color palette control circuit 19 is selected. Two bits are output from a color select register 19c incorporated into color palette control circuit 19 and then added to the 6-bit color palette data set in the selected color palette register, so that data with a total of 8 bits is produced. The 8-bit data is sent to RAMDAC 30 as CRT video data.

In RAMDAC 30, the input 8-bit CRT video data is decoded by a decoder 30a, which permits one of 256 color registers in color table 30b to be selected. The R, G and B data, each of 6 bits, stored in the selected color register are respectively converted by digital-to-analog (D/A) converters 30c, 30d and 30e to analog R, G and B video signals, which are then applied to CRT display 50.

The monochrome gradation video data FVD are obtained as follows.

In image memory 25 having four memory planes 0–3, 8 bits are simultaneously read from storage locations of each memory plane that are designated by the same read address with the result that display data with a total of 32 bits is applied to parallel-to-serial conversion circuit 17. Parallel-to-serial conversion circuit 17 converts 8-bit parallel data from each memory plane into serial data and outputs parallel data of 4 bits each of which is read from a respective one of the four planes 0–3. The four bits that are simultaneously output from parallel-to-serial conversion circuit 17 represent color information for one pixel.

The 4-bit data from parallel-to-serial converter 17 is entered into decoder 19a of color palette control circuit 19 and then decoded therein, As a result of decoding of the 4-bit-per-pixel display data., one of 16 color palette registers 19b in color palette control circuit 19 is selected. Two bits, output from color select register 19c incorporated into color palette control circuit 19, are added to the 6-bit color palette data set in the selected color palette register, so that data with a total of 8 bits is output. The process described so far is the same as the process of producing analog color video signals described previously.

The 8-bit data is applied to multiplexer 306 as color data. Multiplexer 306 is responsive to the 8-bit data to select one of the 256 registers in flat palette table 305. The 4-bit gradation data stored in the selected register is output to flat-panel display 40 as monochrome gradation data FVD for one pixel.

It is to be noted here that, in the associate mode, the gradation data which have been written into flat palette table 305 are data obtained by performing brightness conversion on the color data written into RAMDAC 30 with the human visual sense taken into account, but, in the non-associate mode, they are data directly supplied from CPU 1.

Thus, in the case of gradation data which have been written into flat palette table 305 in the associate mode, the monochrome gradation data FVD output to flat-panel display 40 will have gradation values which are faithful reproductions of colors indicated by the color data in RAMDAC 30. This permits monochrome gradation display associated with a color display on CRT display 50 to be realized on flat-panel display 40.

In the case of gradation data which have been written into flat palette table 305 in the non-associate mode, on the other hand, the gradation data can assume any value as requested by the user or in accordance with an instruction from an application program to be executed independently of the color data in RAMDAC 30. Thus, monochrome gradation display can be realized in any tone that is not associated with a color display on the CRT display.

In addition, since the switching between the associate mode and the non-associate mode is permitted as required, the user selects at his or her disposal between monochrome gradation display that is associated with a color display on the CRT display and monochrome gradation display that is not associated with the color display.

In the present embodiment, conversion table registers 212 and multiplexer 303 were used to convert 6-bit brightness data to 4-bit gradation data as described before in connection with FIGS. 2 and 4. Alternatively, the high-order four bits of the 6-bit brightness data may be used as gradation data. This will eliminate the need for the conversion table registers and the multiplexer.

Conversion table registers 212 and multiplexer 303 are used for the purpose of adjusting the tone of gradation display on flat-panel display 40 as required. That is, as described previously, 16 types of conversion data are uniformly distributed to the 64 registers in conversion table 212 immediately after initialization. In this state, gradation data are varied at a fixed rate according to brightness data such that the gradation data assumes "1", "2", . . . , "15" when the brightness data is "0–3", "4–7", . . . , "60–63", respectively. Thus, if, in the state in which 16 types of conversion data are uniformly distributed to the conversion table registers, data in a specific conversion table register is varied, a gradation value corresponding to brightness data having a specific value can be changed from an initialized level to any other level. This permits the user to make at his or her disposal such an adjustment as to increase or decrease a gradation level corresponding to a specific color in color display according to the tone of monochrome gradation image actually displayed on flat-panel display 40.

When 8-bit-per-pixel display data are formed into the image memory using a packed pixel system as in XGA (extended graphics array), the data can be directly used to select between color data and gradation data without intervention of color palette control circuit 19.

Further, in FIG. 3, video output control circuit 307 is provided so as to simultaneously output monochrome gradation video data FVD for two pixels. The reason is that flat-panel display 40 is usually constructed from two (front and rear ?) panels for the upper (front?) screen and the lower (rear?) screen. If, therefore, flat-panel display 40 comprises a single panel, video output control circuit 307 will not be particularly needed.

Next, reference will be made to FIGS. 7 through 11 to describe a second embodiment of the present invention.

A display control device 4A according to the second embodiment, which, like display control device 4 of FIG. 1 according to the first embodiment, performs display control for both flat-panel display 40 and color CRT display 50 that is connected at the user's option, is greatly distinct from the first embodiment in that RAMDAC 30 is incorporated into the display controller.

That is, display controller 10A in display control device 4A is realized by a single ASIC-based LSI chip, into which all the units of display controller 10 of FIG. 1 and RAMDAC 30 are integrated. In display controller 10A, a flat palette control circuit 21A is used in place of flat palette control circuit 21 of FIG. 1.

Flat palette control circuit 21A, like flat palette control circuit 21 of FIG. 1, generates monochrome gradation video data FVD for flat-panel display 40 and controls the read/write operations of RAMDAC 30. Unlike flat palette control circuit 21 of FIG. 1, flat palette control circuit 21A is arranged to directly obtain monochrome gradation video data FVD by performing brightness conversion on color data (digital R, G and B data) read from the color table in RAMDAC 30, not on color data to be written into the RAMDAC. A specific arrangement of flat palette control circuit 21A will be described below with reference to FIGS. 8 and 9.

Figure 8:
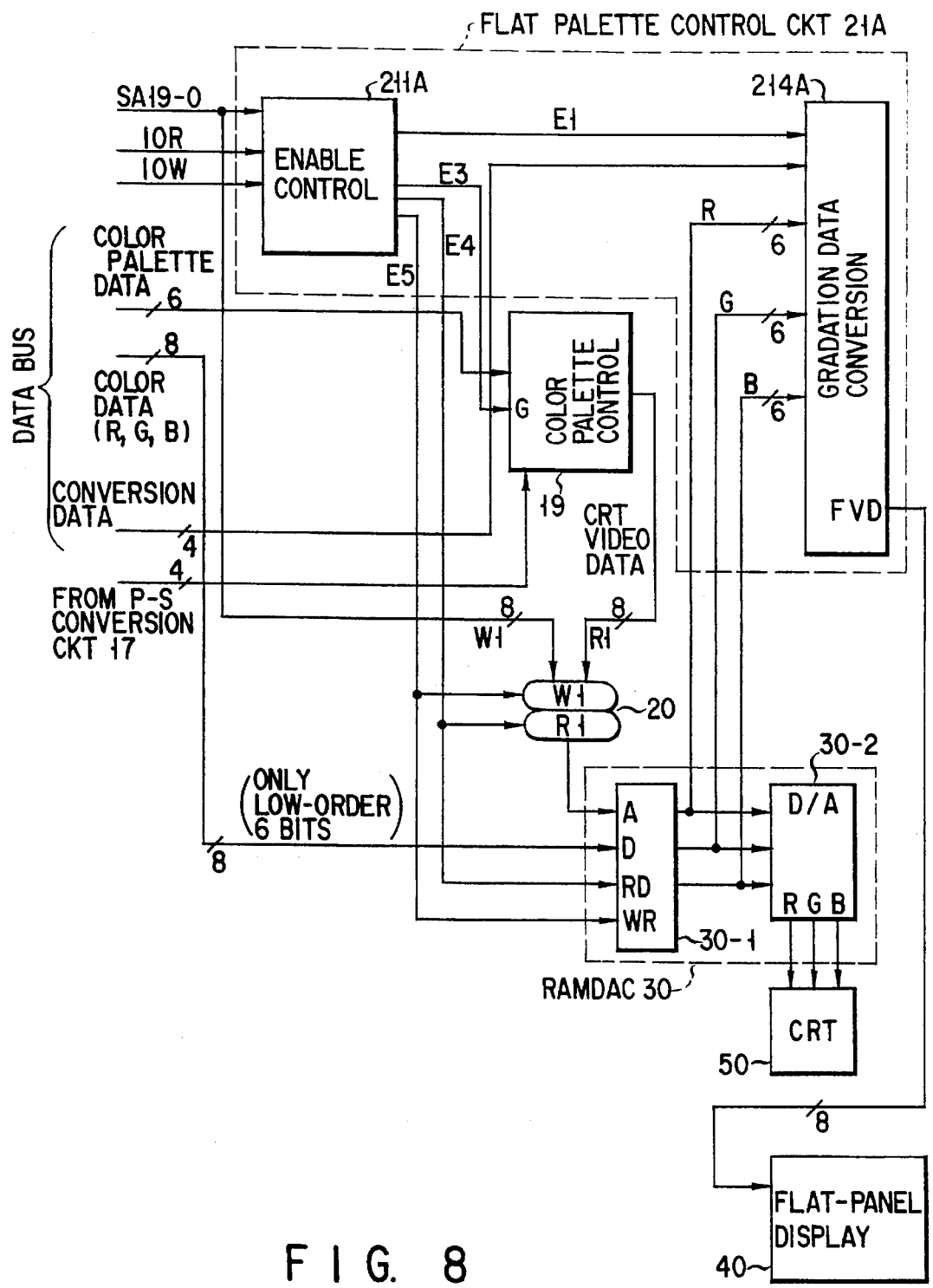
FIG. 8 is a block diagram of the flat-palette control circuit shown in FIG. 7.

As shown in FIG. 8, flat palette control circuit 21A is comprised of an enable control circuit 211A and a gradation data conversion circuit 214A, but it is not equipped with counter 213 described in connection with FIG. 2. Enable control circuit 211A, like enable control circuit 211 of FIG. 2, generates various enable signals in response to the-address (SA19-0), I/O read signal (IOR) and I/O write signal (IOW) which are all supplied from CPU 1. Since counter 213 is not provided here, the enable signals are only E1, E3, E4, and E5. The enable signal E1 is a write enable signal which is rendered active when conversion data is written into conversion table registers 212A, which will be described later, in gradation data conversion circuit 214A. The enable signal E3 is a write enable signal which is rendered active when color palette data is written into each color palette register in color palette control circuit 19. The enable signal E4 is a read enable signal which is rendered active when R, G and B analog color video signals are read out of RAMDAC 30. The enable signal E5 is a write enable signal which is rendered active when R, G and B color data are written into RAMDAC 30.

Gradation data conversion circuit 214A performs brightness conversion on color data read from color table 30-1 of RAMDAC 30 to generate gradation data and outputs it to flat-panel display 40 as monochrome gradation video data FVD. A specific arrangement of gradation conversion circuit 214A is illustrated in FIG. 9.

Figure 9:
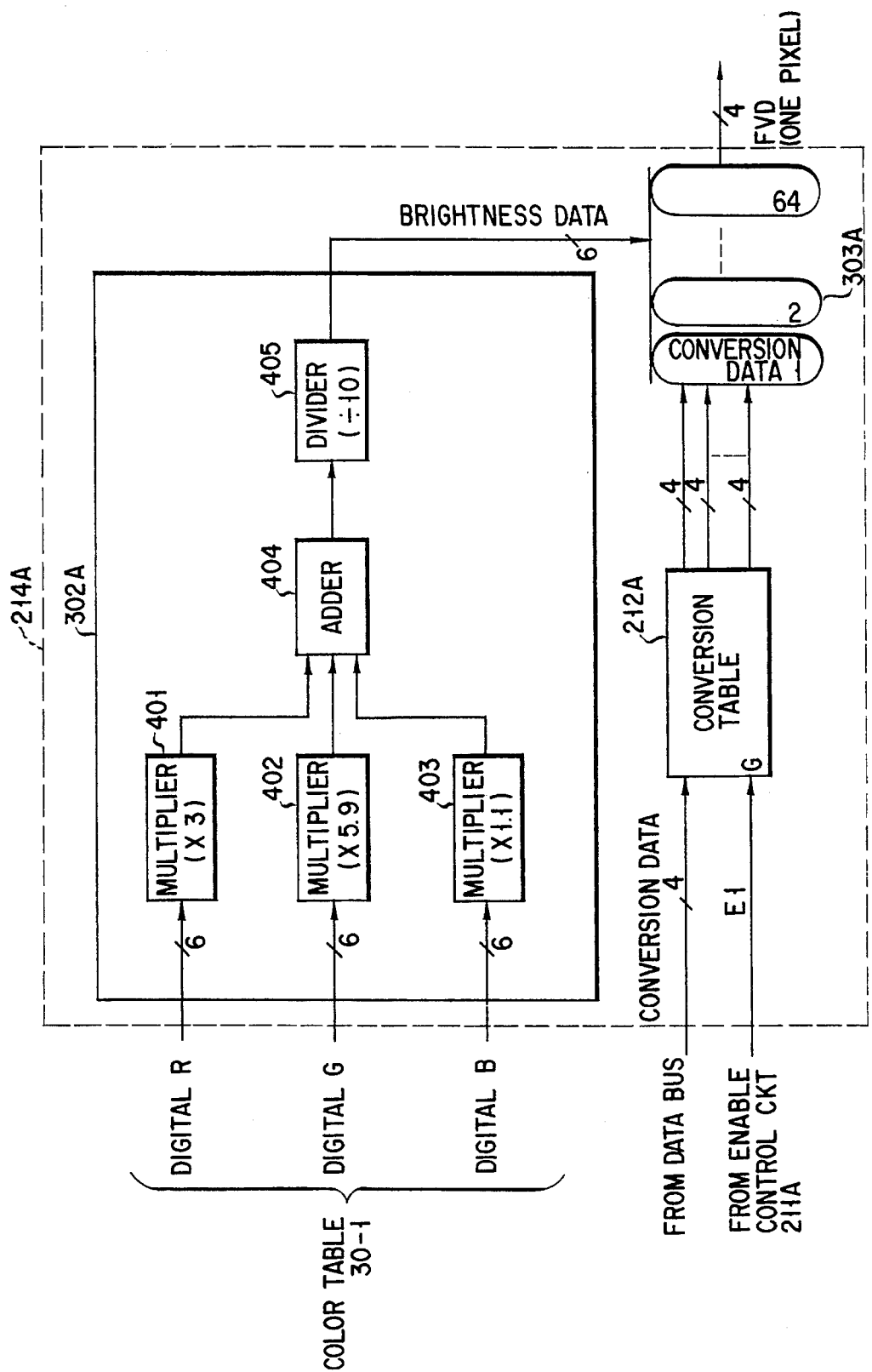
FIG. 9 is a block diagram of the gradation data conversion circuit shown in FIG. 8.

As shown in FIG. 9, gradation data conversion circuit 214A comprises a brightness conversion circuit 302A, a conversion table 212A, and a multiplexer 303A. Gradation conversion circuit 302A receives digital R, G and B data, each of 6 bits, read from color table 30-1 of RAMDAC 30 and converts them to 6-bit brightness data in accordance with formula (1). Brightness conversion circuit 302A, like brightness conversion circuit 302 of the first embodiment described in connection with FIG. 4, comprises first, second and third multipliers 401, 402 and 403, adder 404, and divider 405.

Conversion table 212A is arranged to hold conversion data used for converting 6-bit brightness data obtained in brightness conversion circuit 302A to 4-bit gradation data and, like conversion table 212 in the first embodiment, comprises 64 registers each having a width of 4 bits. To the 64 registers are uniformly distributed 16 pieces of conversion data corresponding to 16 pieces of gradation data. Each conversion data is supplied from CPU 1 over the data bus (D15-0). In this case, the low-order four bits form conversion data. The writing of conversion data into conversion table 212A is carried out at the supply of the enable signal E1 that is in the active state.

Multiplexer 303A is responsive to 6-bit brightness data output from brightness conversion circuit 302A to select one of the 64 registers in conversion table 212A and then outputs the 4-bit conversion data stored in the selected register. The 4-bit conversion data is output as monochrome gradation video data FVD for one pixel to flat-panel display 40.

Figure 10:
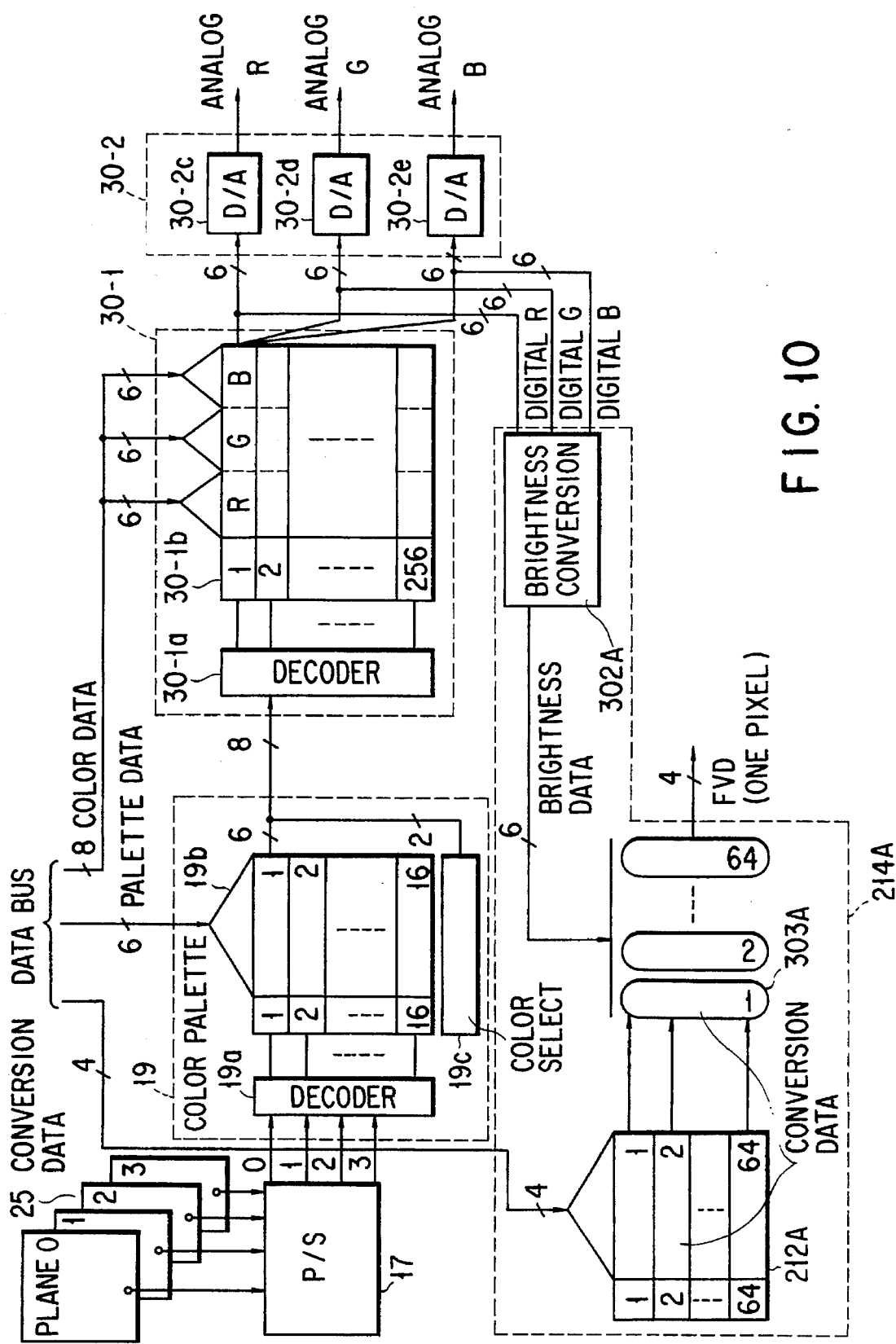
FIG. 10 is a block diagram illustrating the data flow in the display control system of FIG. 7.

Next, reference will be made to FIG. 10 to describe the process of outputting analog R, G and B video signals to CRT display 50 and the process of outputting monochrome gradation video data FVD to flat-panel display 40 according to the second embodiment.

The outputting operation of analog R, G and B signals is performed as follows.

In image memory 25 having four memory planes 0–3, 8 bits are simultaneously read from storage locations of each memory plane that are designated by the same read address with the result that display data with a total of 32 bits is applied to parallel-to-serial conversion circuit 17. Parallel-to-serial conversion circuit 17 converts 8-bit parallel data from each memory plane into serial data and outputs parallel data of 4 bits each of which is read from a respective one of the four planes 0–3. The four bits that are simultaneously output from parallel-to-serial conversion circuit 17 represent display data for one pixel.

The 4-bit-per-pixel display data from parallel-to-serial converter 17 is entered into decoder 19a of color palette control circuit 19 and then decoded therein. As a result of decoding of the 4-bit-per-pixel display data, one of 16 color palette registers 19b in color palette control circuit 19 is selected. Two bits, output from color select register 19c incorporated into color palette control circuit 19, are added to the 6-bit color palette data set in the selected color palette register, so that data with a total of 8 bits is output. The 8-bit data is sent to color table 30-1 in RAMDAC 30 as CRT video data.

In color table 30-1 of RAMDAC 30, the input 8-bit CRT video data is decoded by a decoder 30-1a, which permits one of 256 color registers 30-1b in color table 30-1 to be selected. The R, G and B data, each of 6 bits, stored in the selected color register are sent to a digital-to-analog converter unit 30-2 where they are respectively converted by digital-to-analog (D/A) converters 30-2c, 30-2d and 30-2e to analog R, G and B video signals, which are then applied to CRT display 50.

The monochrome gradation video data FVD are obtained as follows.

In image memory 25 having four memory planes 0–3, 8 bits are simultaneously read from storage locations of each memory plane that are designated by the same read address with the result that display data with a total of 32 bits is applied to parallel-to-serial conversion circuit 17. Parallel-to-serial conversion circuit 17 converts 8-bit parallel data from each memory plane into serial data and outputs parallel data of 4 bits each of which is read from a respective one of the four planes 0–3. The four bits that are simultaneously output from parallel-to-serial conversion circuit 17 represent color information for one pixel.

The 4-bit-per-pixel data from parallel-to-serial converter 17 is entered into decoder 19a of color palette control circuit 19 and then decoded therein. As a result of decoding of the 4-bit-per-pixel display data, one of 16 color palette registers 19b in color palette control circuit 19 is selected. Two bits, output from color select register 19c incorporated into color palette control circuit 19, are added to the 6-bit color palette data set in the selected color palette register, so that data with a total of 8 bits is output. The 8-bit data is sent to color table 30-1 in RAMDAC 30.

In color table 30-1 of RAMDAC 30, the input 8-bit CRT video data is decoded by decoder 30-1a, which permits one of 256 color registers 30-1b in color table 30-1 to be selected. The R, G and B data, each of 6 bits, stored in the selected color register are output from color table 30-1. The operation described so far is the same as in the process of outputting analog R, G and B signals.

The R, G and B data, each of 6 bits, output from color table 30-1 are sent to brightness conversion circuit 302A, where the brightness conversion process is performed in accordance with formula (1), so that the color data consisting of R, G and B data is converted to 6-bit brightness data. The brightness data is then applied to multiplexer 303A. Multiplexer 303 is responsive to the 6-bit brightness data to select ,one of the 64 registers in conversion table 212A. The 4-bit conversion data stored in the selected register is output as one-pixel monochrome gradation data for flat-panel display 40.

As described above, like the first embodiment, the second embodiment, which generates gradation data by means of brightness conversion of color data, permits gradation data that satisfies the human visual sense to be obtained and monochrome gradation display that faithfully reproduces tones of color display on CRT display 50 to be realized on flat-panel display 40.

In addition, incorporating RAMDAC 30 into display controller 10A permits digital R, G, and B color data read out of its color table 30-1 to be entered into gradation data conversion circuit 214A. Thus, the digital R, G, and B color data can be directly converted to brightness data and then output to flat-panel display 40. This eliminates the need for flat palette table 305 and multiplexer 306 that are needed in the first embodiment, thus simplifying the hardware configuration of display controller 10A.

In the second embodiment, conversion table registers 212A and multiplexer 303A are used to convert 6-bit brightness data to 4-bit gradation data. As an alternative, the high-order four bits of 6-bit brightness data may be used as gradation data as they are. It is in order that the tones of gradation display on flat-panel display 40 can be adjusted as required as in the first embodiment that conversion table registers 212A and multiplexer 303A are used in the second embodiment.

Though not shown in gradation data conversion circuit 214A of FIG. 9, where flat-panel display 40 is constructed from two panels, it is natural that video output control circuit 307 shown in FIG. 3 should be placed to follow multiplexer 303A.

Further, like the first embodiment, the second embodiment may be equipped with flat palette table 305 for switching between the associate mode and the non-associate mode.

Figure 11:
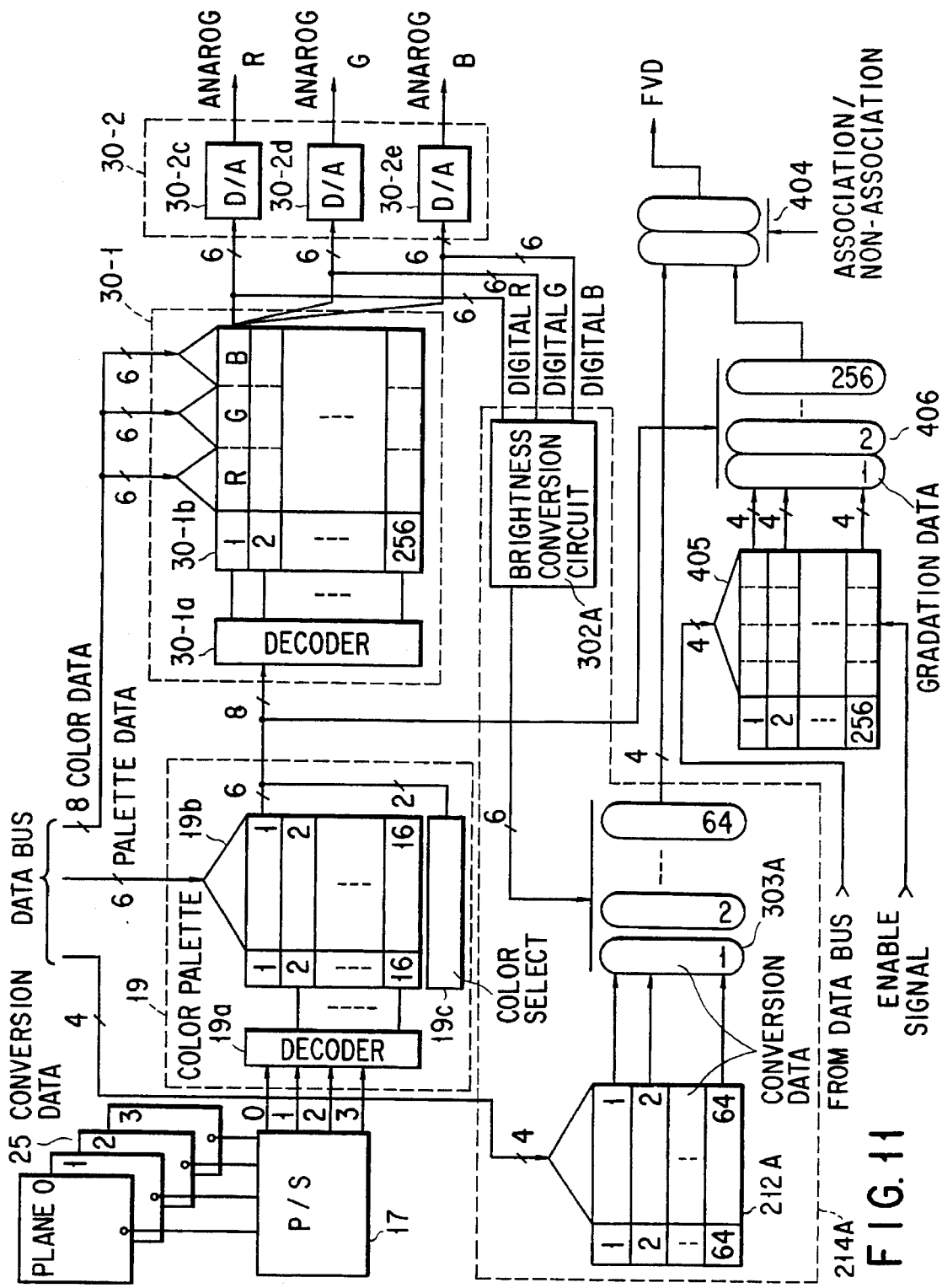
FIG. 11 is a block diagram illustrating the circuit shown in FIG. 7 to which a flat palette table is added.

As in the first embodiment, the switching of interlocking/non-interlocking can be performed in the second embodiment, too, by disposing a flat palette table as shown in FIG. 11. In this case, the gradation data held by the flat palette table 405 is selected by multiplexer 406 in response to the output of the color palette 19. Further, one of the outputs of multiplexers 303A and 406 is selected by multiplexer 404 in response to the interlocking/non-interlocking switching control signal and is supplied through the video output signal control circuit, etc. to the flat panel display device.

Figure 12:
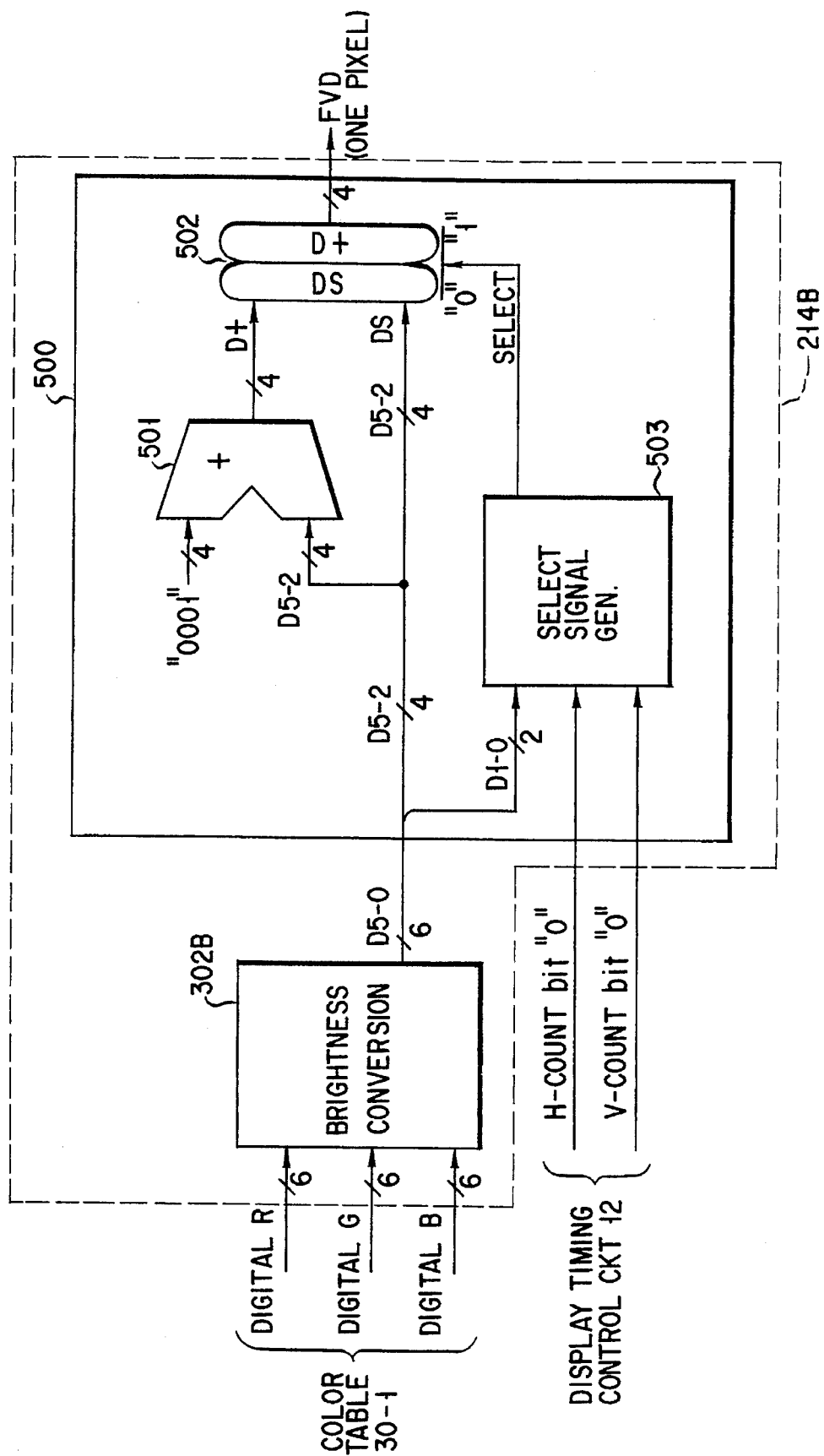
FIG. 12 is a block diagram of a modification of the brightness conversion circuit of FIG. 8.

In FIG. 12 there is shown a modification of gradation data conversion circuit 214A of FIG. 9 in the second embodiment.

Gradation data conversion circuit 214B is arranged to, when flat-panel display 40 is controlled in a multi-color (multi-tone) display mode in which one pixel is formed of 2 by 2 dots on the screen, imitatively emulate the number of gradations in the flat-panel display from 16 to 64. Gradation data conversion circuit 214B is distinct from gradation data conversion circuit 214A in the circuit arrangement for converting 6-bit brightness data to 4-bit gradation data. That is, gradation data conversion circuit 214B comprises a brightness conversion circuit 302B and a 64-gradation emulation circuit 500.

Brightness conversion circuit 302B, like brightness conversion circuit 302A of FIG. 9, receives digital R, G, and B data, each of 6 bits, read from color table 30-1 in RAMDAC 30 and combines (converts) them into 6-bit brightness data in accordance with formula (1).

The 64-gradation emulation circuit, which is adapted to imitatively increase the number of gradations in flat-panel display 40, which is limited to 16 gradations per dot because of pannel's physical characteristics, up to 64, comprises a digital adder 501, a multiplexer 502, and a select signal generator 503.

Digital adder 501 has a first input for receiving standard-value data (Ds; D5-2) consisting of the high-order four bits of 6-bit-per-pixel brightness data (D5-0) output from brightness conversion circuit 302B and a second input for receiving 4-bit addend data of "0001". That is, digital adder 501 adds the addend data "0001"to the standard-value data Ds and then applies the sum, serving as the next-value data (D+), to a first input of multiplexer 502 which has its second input connected to receive the standard-value data Ds.

Multiplexer 502 selects either the standard-value data Ds or the next-value data D+ for application to flat-panel display 40 as one-pixel monochrome gradation data FVD. The select operation of multiplexer 502 is controlled by a select signal SELECT from select signal generator 503. That is, multiplexer 502 selects the standard-value data Ds when the select signal is at a 0 level and the next-value data D+when the select signal is at a 1 level. Thus, multiplexer 502 permits the gradation video data FVD to selectively assume the standard value (Ds) or the next value (D+) for each of four dots comprising one pixel.

Select signal generator 503 is responsive to the low-order two bits (D1-0) of the brightness data (D5-0) output from brightness conversion circuit 302B to select one of 4 ($=2^2$) gradation patterns and generates a select signal SELECT at a 0 or 1 level in accordance with the selected gradation pattern and the values (H-COUNT bit "0", V-COUNT bit "0") of bits 0 in horizontal and vertical counters.

Figure 13:
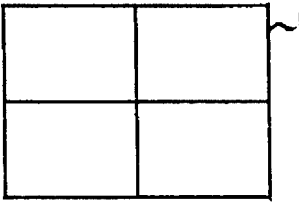
FIG. 13 illustrates exemplary gradation patterns used in the gradation conversion circuit of FIG. 12.

A gradation pattern indicates which of standard-value data (DS) and next-value data (D+) is to be selected for each of four dots forming one pixel. As an example, four types of gradation patterns are illustrated in FIG. 13.

As shown, each of gradation patterns P1 through P4 is formed of a 2×2 dot-pattern and indicates that a selection is made between standard-value data (Ds) and next-value data (D+) for each of the four dots. The gradation patterns P1 through P4 differ from one another in proportion in which a next-value-data selecting dot or dots are contained. That is, each of the gradation patterns P1 through P4 exhibits a separate gradation level.

The gradation pattern P1 corresponds to D1=0 and D0=0 and specifies the standard-value data (Ds) for each of the 2×2 dots. The gradation pattern P2 corresponds to D1=0 and D0=1 and, as shown, specifies the next-value data (D+) only for the dot at the lower right in the 2×2 dot-pattern and the standard-value data (Ds) for the remaining three dots. The gradation pattern P3 corresponds to D1=1 and D0=0 and, as shown, specifies the next-value data for the dot at the upper left and the dot at the lower right and the standard-value data for the remaining two dots. The gradation pattern P4 corresponds to D1=1 and D0=1 and, as shown, specifies the standard-value data only for the dot at the lower right and the next-value data for the remaining three dots. Thus, the gradation pattern P4 is lowest in gradation level, followed by the gradation patterns P2, P3 and P4 in this order.

The horizontal and vertical counters are used in display timing control circuit 12 in order to generate the line pulse LP and the field pulse FP described previously. A count in the horizontal counter indicates a dot position in the horizontal direction in flat-panel display 40. Thus, bit 0 (H-COUNT bit "0") in the horizontal counter alternates between 0 and 1 for each dot position in the horizontal direction. A count in the vertical counter indicates the position of a horizontal scanning line in the vertical direction in the flat-panel display. Thus, bit 0 (V-COUNT bit "0") in the vertical counter alternates 0 and 1 for each of the horizontal scanning lines arranged in the vertical direction. Therefore, a combination of bits 0 in the horizontal and vertical counters indicates the position of a dot that is currently being scanned within 2×2 dots forming one pixel.

More specifically, when a dot that is being scanned is at the upper left within a 2×2 dot-array, bits 0 in the horizontal and vertical counters are both 0. For the dot at the upper right, the bits 0 in the horizontal and vertical counters are 0 and 1, respectively. For the dot at the lower left, the bits 0 are 1 and 0, respectively. Similarly, for the dot at the lower right, the bits 0 are 1 and 1, respectively. The position of a dot that is currently being scanned, which is specified by values of the bits 0 in the horizontal and vertical counters, is used to determine which of information that a selected pattern has for four dots is to be used.

Figure 14:
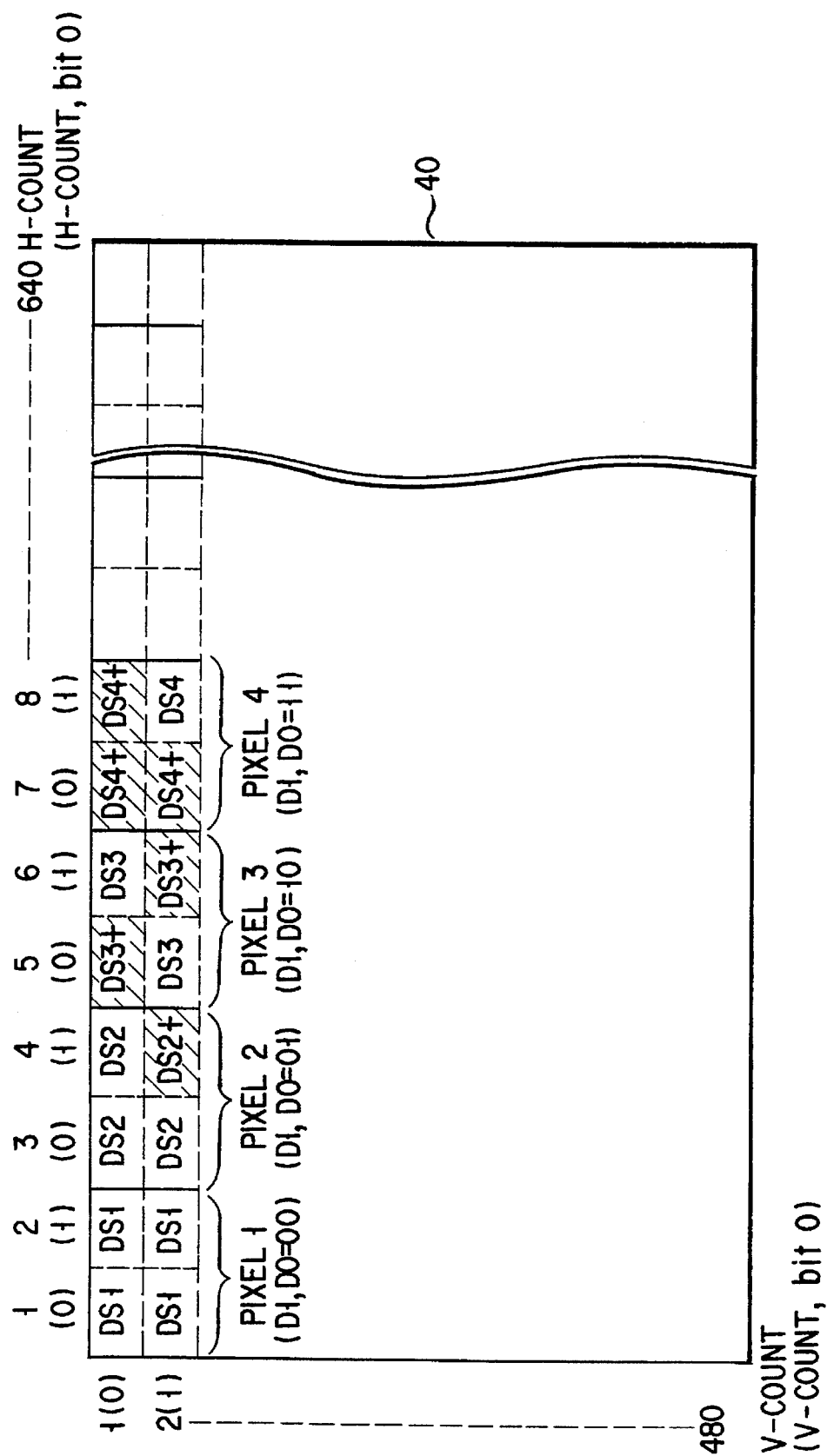
FIG. 14 illustrates an example of a monochrome gradation display on a flat-panel display adapted to display gradation data generated by the gradation conversion circuit of FIG. 12.

In FIG. 14, there is illustrated an example of the display screen of flat-panel display 40 in a multi-color display mode in which one pixel is formed of 2×2 dots. Since flat-panel display 40 has a resolution of 640×480 dots conforming to the VGA specifications, a 320×320 dot graphic display will result in the multi-color display mode where one pixel is formed of 2×2 dots.

In the multi-color display mode, as shown, the first pixel is displayed by first and second dots on first and second scanning lines. Likewise, the second pixel is displayed by third and fourth dots on the first and second scanning lines. The third pixel is displayed by fifth and sixth dots on the first and second scanning lines, while the fourth pixel is displayed by seventh and eighth dots on the first and second scanning lines.

Hereinafter, the operation of 64-gradation emulation circuit 500 of FIG. 12 will be described with reference to the display screen shown in FIG. 14.

Suppose here that the low-order two bits D1 and D0 of gradation data for the first pixel are both 0s, the D1 and D0 for the second pixel are 0 and 1, respectively, the D1 and D0 for the third pixel are 1 and 0, respectively, and the D1 and D0 for the fourth pixel are 1 and 1, respectively.

When the low-order two bits of gradation data for the first pixel are both 0s, select signal generator 503 selects the gradation pattern P1 of FIG. 13. The pattern P1 specifies standard-value data (Ds) for all of the four dots. Thus, select signal generator 503 generates a select signal SELECT at a 0 in any of cases where bits 0 in the horizontal and vertical counters are 0 and 0 (indicating the upper left dot), 0 and 1 (the upper right dot), 1 and 0 (the lower left dot), and 1 and 1 (the lower right dot). As a result, multiplexer 502 selects standard-value data (Ds1) consisting of the high-order four bits of gradation data (D5-0) for the first pixel as video data FVD for each of the four dots displaying the first pixel. Thus, the gradation levels of the four dots forming the first pixel on the display screen all correspond to the standard-value data consisting of the high-order four bits of the gradation data (D5-0) for the first pixel.

When the low-order two bits D1 and D0 of gradation data for the second pixel are 0 and 1, respectively, select signal generator 503 selects the gradation pattern P2 of FIG. 13. The pattern P2 specifies next-value data (D+) only for the dot at the lower right and standard-value data (Ds) for the remaining three dots. Thus, select signal generator 503 generates a select signal at a 0 when the bits 0 in the horizontal and vertical counters are 0 and 0, 0 and 1, and 1 and 0 and a select signal at a 1 when the bits 0 are 1 and 1. Consequently, multiplexer 502 selects standard-value data (Ds2) consisting of the high-order four bits of gradation data (D5-0) for the second pixel as video data FVD for the three dots at the upper left, upper right, and lower left within the four-dot array forming the second pixel and next-value data (Ds2+) corresponding to the gradation data (D5-0) for the second pixel as video data FVD for the lower right dot. Therefore, the gradation levels of the four dots forming the second pixel on the display screen correspond to the next-value data (Ds2+) for the lower right dot and the standard-value data (Ds2) for the three remaining dots at the upper left, the upper right, and the lower left.

When the low-order two bits D1 and D0 of gradation data for the third pixel are 1 and 0, respectively, select signal generator 503 selects the gradation pattern P3 of FIG. 13. The pattern P3 specifies next-value data (D+) for the two dots at the upper left and the lower right and standard-value data (Ds) for the two dots at the upper left and the lower left. Thus, select signal generator 503 generates a select signal at a 0 when the bits 0 in the horizontal and vertical counters are 0 and 1 (indicating the upper right dot position), and 1 and 0 (indicating the lower left dot position) and a select signal at a 1 when the bits 0 are 0 and 0 (indicating the upper left dot position), and 1 and 1 (indicating the lower right dot position). Consequently, multiplexer 502 selects standard-value data (Ds3) consisting of the high-order four bits of gradation data (D5-0) for the third pixel as video data FVD for the two dots at the upper right and the lower left within the four-dot array forming the third pixel and next-value data (Ds3+) corresponding to the gradation data (D5-0) for the third pixel as video data FVD for the two dots at the lower right and upper right. Therefore, the gradation levels of the four dots forming the third pixel on the display screen correspond to the next-value data (Ds3+) for the upper-left and lower-right dots and the standard-value data (Ds3) for the upper-right and lower-left dots.

When the low-order two bits D1 and D0 of gradation data for the fourth pixel are 1 and 1, respectively, select signal generator 503 selects the gradation pattern P4 of FIG. 13. The pattern P4 specifies standard-value data (Ds) only for the dot at the lower right and next-value data (D+) for the remaining three dots. Thus, select signal generator 503 generates a select signal at a 0 when the bits 0 in the horizontal and vertical counters are 1 and 1 and a select signal at a 1 when the bits 0 are 0 and 0, 0 and 1, and 1 and 0. Consequently, multiplexer 502 selects standard-value data (Ds4) consisting of the high-order four bits of gradation data (D5-0) for the third pixel as video data FVD for the dot at the lower right and next-value data (Ds4+) corresponding to the gradation data (D5-0) for the third pixel as video data FVD for the upper-left, upper-right and lower-left dots within the four-dot array forming the fourth pixel. Therefore, the gradation levels of the four dots forming the fourth pixel on the display screen correspond to the standard-value data (Ds4) for the lower-right dot and the next-value data (Ds4+) for the three upper-left, upper-right and lower-left dots.

Referring to FIG. 15, there is shown a specific arrangement of select signal generator 503, which comprises four-input AND gates 601, 602 and 603, a three-input AND gate 604, an OR gate 605, inverters 606 to 610, and a two-input AND gate 611.

Four-input AND gate 601 has a first input for receiving the bit 0 of the horizontal counter (H-COUNT bit"0"), a second input for receiving the bit 0 of the vertical counter (V-COUNT bit"0"), a third input for receiving the data D1 via inverter 606, and a fourth input for receiving the data D0. Four-input AND gate 602 has a first input for receiving the bit 0 of the horizontal counter via inverter 607, a second input for receiving the bit 0 of the vertical counter via inverter 608, a third input for receiving the data D1, and a fourth input for receiving the data D0 via inverter 609. Four-input AND gate 603 has a first input for receiving the bit 0 of the horizontal counter, a second input for receiving the bit 0 of the vertical counter, a third input for receiving the data D1, and a fourth input for receiving the data D0 via inverter 610. Three-input AND gate 604 has a first input for receiving the output of NAND gate 611, a second input for receiving the data D1 and a third input for receiving the data D0. Two-input NAND gate 611 has a first input for receiving the bit 0 of the horizontal counter, and a second input for receiving the bit 0 of the vertical counter. The outputs of AND gates 601 to 604 are coupled to the four inputs of OR gate 605. OR gate 605 outputs the select signal SELECT, which is applied to multiplexer 502.

In select signal generator 503, if the data D1 and D0 are 0 and 0 that select the gradation pattern P1, then AND gates 601 to 604 will constantly produce 0s regardless of the bits 0 of the horizontal and vertical counters. This sets the output SELECT of OR gate 605 to a 0, so that all the four dots are set to standard-value data (Ds).

If the data D1 and D0 are 0 and 1 that select the gradation pattern P2, then AND gate 601 will output a 1 when the bits 0 of the horizontal and vertical counters are 1 and 1 that indicate the lower-right dot position. That is, the select signal SELECT goes to a 1 when the lower-right dot is scanned, so that next-value data (D+) is output for the lower-right dot.

If the data D1 and D0 are 1 and 0 that select the gradation pattern P3, then AND gate 602 will output a 1 when the bits 0 of the horizontal and vertical counters are 0 and 0 that indicate the upper-left dot position. Also, when the bits 0 of the horizontal and vertical counters are 1 and 1 that indicates the lower-right dot position, AND gate 603 will output a 1. That is, the select signal SELECT goes to a 1 when the upper-left and lower-right dot are scanned, so that next-value data (D+) is output for the upper-left and lower-right dots.

NAND gate 611 outputs a 1 when the bits 0 of the horizontal and vertical counters are 0 and 0, 0 and 1, and 1 and 0, which indicate the upper-left, upper-right and lower-left dot positions, respectively, and a 0 when the bits 0 are 1 and 1 which indicate the lower-right dot position. Thus, if the data D1 and D0 are 1 and 1 that select the gradation pattern P4, AND gate 604 will output a 1 when the bits 0 of the horizontal and vertical counters are 0 and 0, 0 and 1, and 1 and 0 that indicate the upper-left, upper-right and lower-left dot positions, respectively. That is, the select signal goes to a 1 when the upper-left, upper-right and lower-left dots are scanned, outputting next-value data (D+) for them.

As can been seen from the foregoing, 64-gradation emulation circuit 500 permits gradation emulation from 16 gradations which can be represented by 4-bit gradation data to 64 (16×4) gradations by a combination of 4-bit gradation data and four types of gradation patterns. In the multi-color display mode in which one pixel is represented as four dots, therefore, pseudo-gradation display with as many as 64 gradations can be realized on flat-panel display 40 which is adapted, in practice, for 16-gradation display. This will realize monochrome gradation display faithfully reproducing tones of color display on the CRT display.

The display system utilizing such gradation patterns can be adapted not only for monochrome flat-panel display 40 but also for a color flat-panel display which is controlled in the multi-color display mode. In the multi-color display mode, one pixel is composed of four dots for each of R, G, and B.

The color display control utilizing gradation patterns can be realized by incorporating a color video data output circuit 700 for flat-panel display that is configured as shown in FIG. 16 into flat palette control circuit 21A of FIG. 8 used in the second embodiment of the present invention.

As shown in FIG. 16, color video data output circuit 700 is constructed from an R data output circuit 701, a G data output circuit 702, and a B data output circuit 703. R data output circuit 701 receives R data consisting of 6 bits from color table 30-1 and produces R video data R-FVD of 4 bits from the R data using the previously-described four gradation patterns, Similarly, G data output circuit 702 receives G data consisting of 6 bits from color table 30-1 and produces G video data R-FVD of 4 bits from the G data using the previously-described four gradation patterns, and B data output circuit 703 receives B data consisting of 6 bits from color table 30-1 and produces B video data R-FVD of 4 bits from the B data using the four gradation patterns.

The video data R-FVD, G-FVD and B-FVD are applied to a color liquid-crystal display 40A of super-twisted nematic (STN) type, etc.

R, G and B data output circuits 701, 702 and 703 are identical to one another in circuit arrangement. Their specific arrangement will be described taking R data output circuit 701 by way of example.

Figure 17:
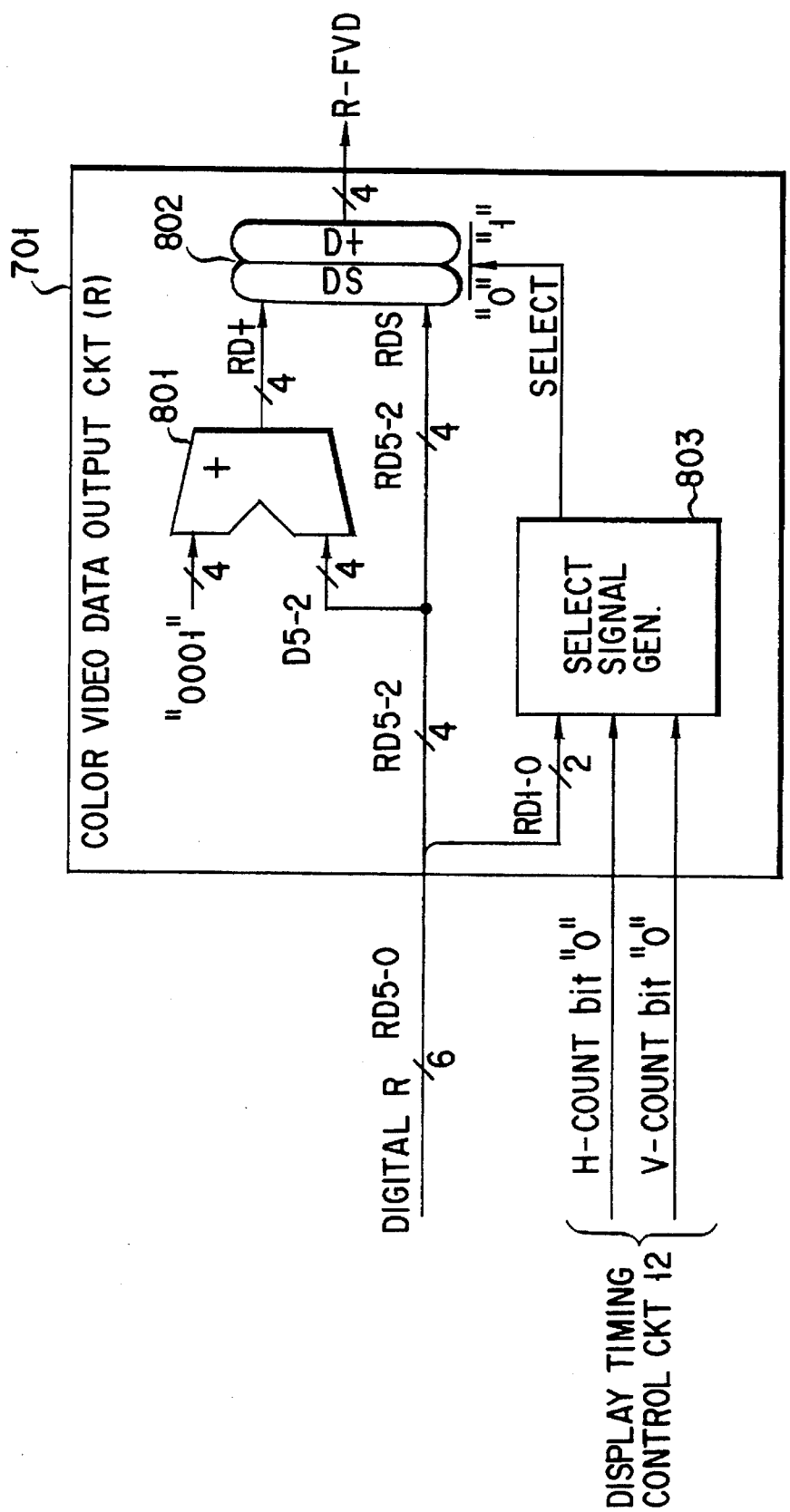
FIG. 17 illustrates a specific circuit arrangement of the color video output circuit of FIG. 16.

As shown in FIG. 17, R data output circuit 701, which has the same circuit arrangement as 64-gradation emulation circuit 500 shown in FIG. 12, comprises an R data output circuit 701, a digital adder 801, a multiplexer 802, and a select signal generator 803.

Digital adder 801 has a first input for receiving standard-value data (Ds; D5-2) consisting of the high-order four bits of 6-bit-per-pixel digital R data (D5-0) output from color table 30-1 in RAMDAC 30 and a second input for receiving 4-bit addend data of "0001". That is, digital adder 501 adds the addend data "0001" to the standard-value data Ds and then applies the sum, serving as next-value data (RD+), to a first input of multiplexer 802 which has its second input connected to receive the standard-value data RDs.

Multiplexer 802 selects either the standard-value data RDs or the next-value data RD+ for application to STN color liquid-crystal display 40A as R video data R-FVD. The select operation of multiplexer 802 is controlled by a select signal SELECT from select signal generator 803. That is, multiplexer 802 selects the standard-value data RDs when the select signal is at a 0 level and the next-value data RD+ when the select signal is at a 1 level. Thus, multiplexer 502 permits the R video data R-FVD to selectively assume the standard value (RDs) or the next value (RD+) for each of four R dots within one pixel.

Select signal generator 803 is responsive to the low-order two bits (RD1-0) of the digital R data (RD5-0) to select one of 4 ($=2^2$) gradation patterns and generates a select signal SELECT at a 0 or 1 level in accordance with the selected gradation pattern and values (H-COUNT bit "0", V-COUNT bit "0") of the bits 0 in the horizontal and vertical counters. The operation and specific circuit arrangement of select signal generator 803 are exactly the same as those of select signal generator 503 described previously.

The gradation pattern indicates which of standard-value data (DS) and next-value data (D+) is to be selected for each of four (2×2) dots forming each of R, G and B pixels. The four gradation patterns are provided for each of R, G and B. An example of the four gradation patterns for each of R, G and B is illustrated in FIG. 18.

Figure 18:
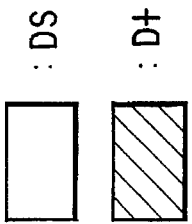
FIG. 18 illustrates exemplary gradation patterns used in the color video output circuit of FIG. 16.

FIG. 18 illustrates a case where R, G and B pixels have the same four gradation patterns P1 to P4. Each of gradation patterns P1 through P4 is formed of a 2×2 dot-pattern and indicates that which of standard-value data (Ds) and next-value data (D+) is selected for each of the four dots. The gradation patterns P1 through P4 differ from one another in proportion in which a next-value-data selecting dot or dots are contained. That is, each of the gradation patterns P1 through P4 exhibits a separate gradation level.

The gradation pattern P1 corresponds to D1=0 and D0=0 and specifies the standard-value data (Ds) for each of the 2×2 dots as shown. The gradation pattern P2 corresponds to D1=0 and D0=1 and, as shown, specifies the next-value data (D+) only for the dot at the lower right in the 2×2 dot-pattern and the standard-value data (Ds) for the three remaining dots. The gradation pattern P3 corresponds to D1=1 and D0=0 and, as shown, specifies the next-value data for the dot at the upper left and the dot at the lower right and the standard-value data for the two remaining dots. The gradation pattern P4 corresponds to D1=1 and D0=1 and, as shown, specifies the standard-value data (Ds) only for the dot at the lower right in the 2×2 dot-pattern and the next-value data for the three other dots. Thus, the gradation pattern P4 is lowest in gradation level, followed by the gradation patterns P2, P3 and P4 in this order.

Figure 19:
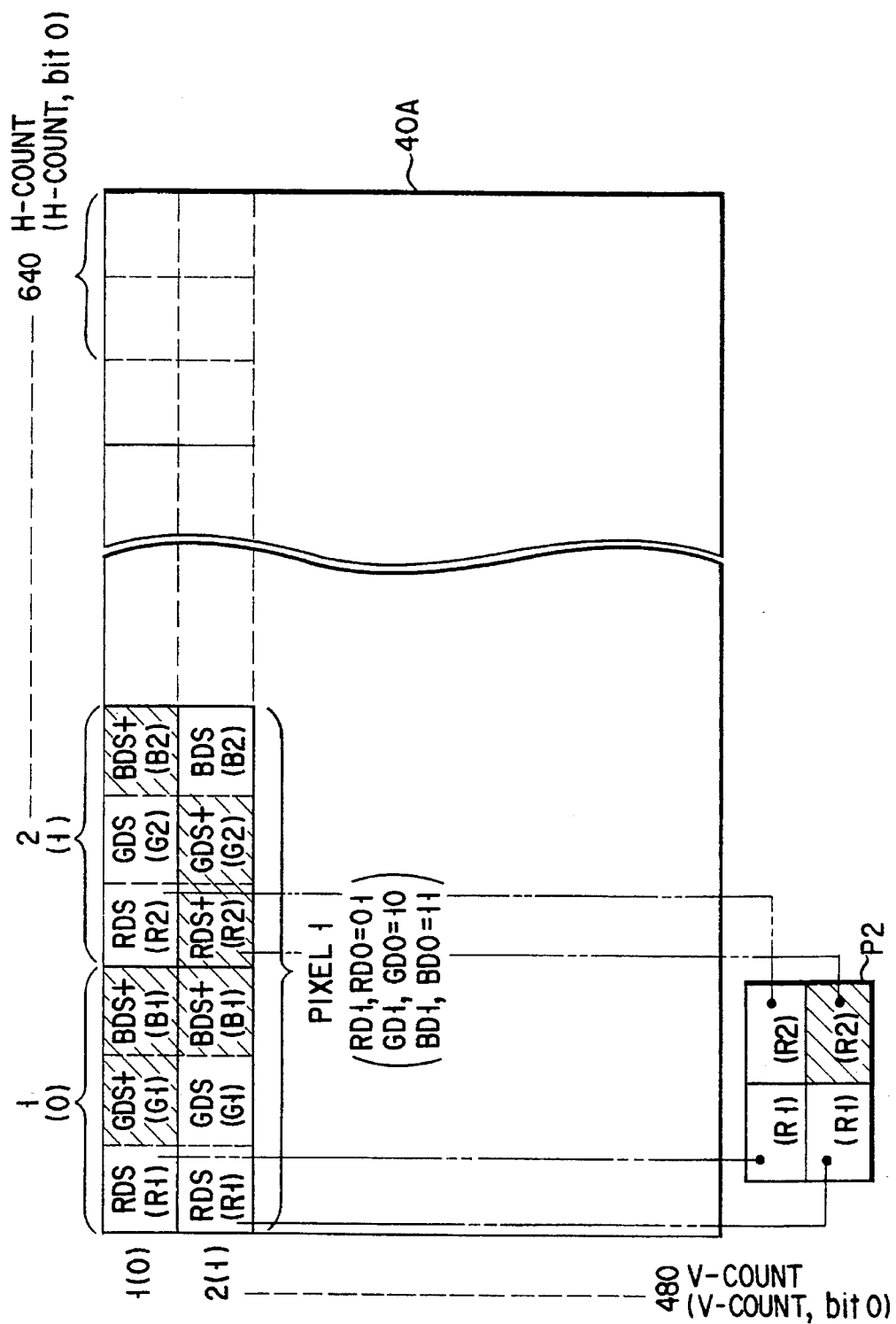
FIG. 19 illustrates an example of a color display on a flat-panel display adapted to display gradation data generated by the gradation conversion circuit of FIG. 12.

In FIG. 19 there is illustrated an example of a display screen of STN color liquid-crystal display 40A in the multi-color display mode in which one pixel is composed of 2×2 dots for each of R, G and B.

In the case of color display, a set of three R, G and B sub-dots forms one dot on the display screen. In the multi-color display mode, therefore, R, G and B sub-dots forming the first pixel are, as shown, displayed in the first and second dot positions on first and second scanning lines so that one pixel may be formed of 2×2 dots for each of R, G and B.

Hereinafter, the operation of color video output circuit 700 of FIG. 16 will be described with reference to FIG. 19.

Suppose here that, for the first pixel, the low-order two bits RD1 and RD0 of digital R data are 0 and 1, GD1 and GD0 of digital G data are 1 and 0, and BD1 and BD0 of digital B data are 1 and 1.

When the low-order two bits RD1 and RD0 of digital R data are 0 and 1, respectively, select signal generator 803 of FIG. 16 selects the gradation pattern P2 shown in FIG. 18. The gradation pattern P2 specifies next-value data (RD+) only for the lower-right dot within the 2×2 dot-pattern and standard-value data (RDs) for the three remaining dots. Thus, select signal generator 803 generates a select signal SELECT at a 0 when the bits 0 of the horizontal and vertical counters are 0 and 0 (indicating the upper-left dot position), 0 and 1 (indicating the upper-right dot position), and 1 and 0 (indicating the lower-left dot position) and a select signal at a 1 when the bits 0 in the horizontal and vertical counters are 1 and 1 (indicating the lower-right dot position). Consequently, multiplexer 802 selects standard-value data (RDs) consisting of the high-order four bits of the digital R data (RD5-0) as R video data R-FVD for each of the upper-left, upper-right and lower-left dots within the four R dots and the next-value data (RDs+) corresponding to the digital R data as R video data R-FVD for the lower-right dot. Therefore, the gradation levels of the four R dots on the display screen correspond to the next-value data (RDs+) for the lower-right dot and the standard-value data (RDs) for the upper-left, upper-right and lower-left dots.

The same operation as described above is performed in each of G data output circuit 702 and B data output circuit 703 of FIG. 16. As a result, G data output circuit 702 selects between standard-value data (GDs) and next-value data (GDs+) on the basis of the gradation pattern P3; the gradation levels of the four G dots on the display screen correspond to the next-value data for the upper-right and lower-left dots and the standard-value data for the upper-right and lower-left dots. Also, B data output circuit 703 selects between standard-value data (BDs) and next-value (BDs+) on the basis of the gradation pattern P4; the gradation levels of the four B dots on the display screen correspond to the standard-value data for the lower-right dot and the next-value data for the upper-left, upper-right and lower-left dots.

As can be seen, in the case of the multi-color display mode as well, gradation emulation from, 16 gradations represented by four bits for each of R, G and B to 64 (=16×4) gradations can be performed by a combination of color video data, consisting of four bits for each of R, G and B, and four gradation patterns. This permits pseudo-color display with $64^3$ colors to be realized on color liquid-crystal display 40A.

In the embodiments described herein, one pixel in monochrome gradation display consists of a 2×2 dot-pattern, while one pixel in color display also consists of a 2×2 dot-pattern for each of R, G and B. This is not restrictive. Any other dot pattern, such as 1×2, etc., may be used for one pixel in monochrome gradation display and for each of R, G and B sub-pixels within one pixel in color display. In this case, gradation patterns each of which is the size of a dot pattern used should be used.

Output circuits 701, 702 and 703 in color video data output circuit 700 for flat-panel display, shown in FIG. 16, are each identical in circuit arrangement to 64-gradation emulation circuit 500 of FIG. 12. Thus, the provision of color video data output circuit 700 would permit one of its output circuits, for example, R data output circuit 701, to be used for 64-gradation emulation of monochrome gradation data.

FIG. 20 shows a display control device according to a third embodiment of the present invention. The device of this embodiment supports a TFT color liquid crystal display device and an STN (super twisted nematic) liquid crystal display device.

As shown in FIG. 20, the display control device comprises a color palette control circuit 419 provided with 16 color palette registers 419a which are selected by 4-bit/pixel display data output from a parallel/serial conversion circuit (P/S). The 6-bit (0–5) color palette data output from the color palette register 419a is supplied to a multiplexer (MUX) 419d. The multiplexer 419d is also supplied with 4-bit data (0–4) generated from a color selection register 419b and 8-bit data generated from an over-scan register 419c. The data for defining the displayed color outside the display area (border) of the display device is held in the over-scan register 419c.

A 2-bit selection control signal (not shown) is supplied to the multiplexer 419d. When the selection control signal is "00", the multiplexer 419d selects the second and third bits of the 6-bit data generated from the color palette register 419a and the 4-bit data generated from the color selection circuit 419b so as to output 8-bit data. When the selection control signal is "01", the multiplexer 419d selectively outputs the 0-th to third bits of the output data generated from the color palette register 419a and 4-bit data generated from the color selection circuit 419b. When the selection control signal is "10" or "11", the multiplexer 419d selects and outputs 8-bit data generated from the over-scan register 419c.

Figure 7:
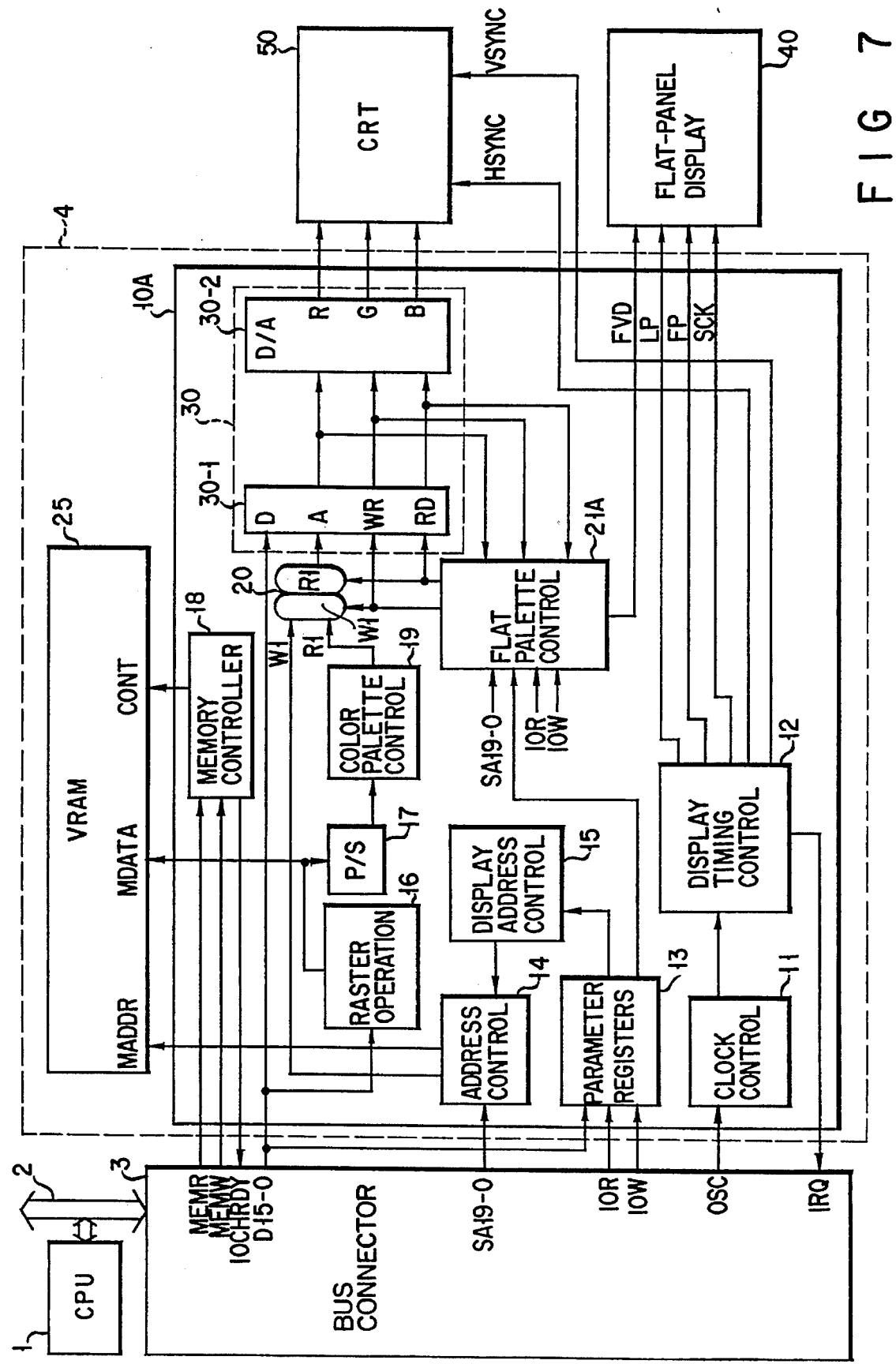
FIG. 7 is a block diagram of the whole of a display control device according to a second embodiment of the present invention.

The 8-bit data output from the color palette control circuit 419 is supplied to the video DAC 430, which is substantially equal in construction to the RAMDAC 30 shown in FIG. 7 and is provided with 256 color palettes and DACs for RGB. The output from the DAC 430 is supplied to a CRT.

The color data of 18 bits (6 bits for each of RGB) generated from the color palette is supplied to a 180 k color emulation circuit 451 for a TFT (thin film transistor) color LCD. The emulation circuit serves to form color data for a TFT color liquid crystal from color data of 18 bits.

The color data of 18 bits output from the color palette is also supplied to the brightness conversion circuit 402 and a 64 gradation emulation circuit 410. The brightness conversion circuit 402, which is constructed as shown in FIG. 4, serves to convert the RGB color data supplied thereto into 6-bit data exhibiting a corresponding brightness. The output data from the brightness conversion circuit 402 is supplied to a conversion table 412, which is equal in construction to, for example, the conversion table 212 and the multiplexer 303 shown in FIG. 3. The conversion table 412 outputs gradation data of 4-bits in response to the gradation data supplied from the brightness conversion circuit 402.

A 64 gradation emulation circuit 453 includes both the 64 gradation emulation circuit shown in FIG. 12 and the video data output circuit 700 included the circuit of FIG. 16 and shown in detail in FIG. 17. The 64 gradation emulation circuit 453 outputs gradation data FVD of 4-bits and RGB brightness data as R-FVD, G-FVD and B-FVD in response to the brightness data supplied from the brightness conversion circuit 402 and the data supplied from the color palette within the video DAC 430.

A multiplexer 455 selectively outputs one of the 4-bit gradation data supplied from the conversion table 412 and the 4-bit gradation data supplied from the emulation circuit 410.

The output of the multiplexer 455 is supplied directly to a multiplexer 457, and at the same time, through a flip-flop 459 to the multiplexer 457 with delay of one clock. The flip-flop 459, which corresponds to the video output control circuit 307 shown in FIG. 3, serves to align the output timing of gradation data of two pixels.

The signals R-VFD and G-VFD included in the brightness signals generated from the emulation circuit 453 are also supplied to the multiplexer 457.

One of the data supplied from the multiplexer 455 and the data supplied from the emulation circuit 453 is selected by the multiplexer 457 in response to a control signal (not shown) so as to be supplied to a plasma display device.

The output of the multiplexer 457 is supplied to an LCD frame thinning circuit 461 together with B gradation data B-FVD supplied from the emulation circuit 453. The frame thinning circuit 461 designates on/off of each display dot of the STN LCD based on the horizontal and vertical conditions and frame condition. In this embodiment, since the frame thinning circuit 461 is incorporated in the display device, the video output of the display control device can be applied to the LCD panel directly.

Gradation data for each of the colors R, G, B output from the frame thinning circuit 461 is supplied to an RGB dot control circuit 463. The RGB dot control circuit 463 serves to perform an on-off control of the display dots as shown in FIGS. 18 and 19 so as to enable the liquid crystal display device to perform a gradation display.

The gradation data generated from the LCD frame thinning circuit 461 is supplied to an STN monochromatic LCD.

The circuit construction shown in FIG. 20 permits displaying an optional picture image selected from the group consisting of a color CRT, a TFT color LCD, a plasma display, an STN monochromatic LCD, a TN monochromatic LCD and an STN color LCD.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A display control device for controlling a color CRT display and a monochrome flat-panel display with $2^m$ gradations, comprising:

color table means having a plurality of color registers for holding color data for one pixel of said color CRT display, one of said color registers being selected by display data having color information;

supply means for converting R, G, B color data held by the selected register of the color table means into analog color video signals and for supplying the converted video signals to said color CRT display;

summing-colors-to-gray-scale means for converting the intensity value found for each of the color data R, G, and B written into the selected color registers of the color table means into its corresponding gray scale value of n bits (n>m);

forming means for adding a predetermined value to first gradation data represented by the high-order m bits of the n-bit gray scale value (n>m) converted by the summing-colors-to-gray-scale means so as to form a set of second gradation data of m bits;

selecting means connected to each of said set of forming means and said flat panel display for selecting one of said first gradation data and said set of second gradation data in accordance with a select signal for each of a plurality of dots constituting one pixel of a flat panel display device and for supplying the selected data to said flat panel display; and select signal generating means connected to said selecting means for generating said select signal denoting assignment of the selected data to said plurality of dots in accordance with the value of the low-order n-m bits of the first gradation data.

2. The display control device according to claim 1, wherein said select signal generating means comprises means connected to said selecting means for selectively generating $2^{(n-m)}$ different gradation patterns each indicating assignment of the first or second gradation data for said plurality of dots in accordance with the value of the lower-order (n-m) bits of the first gradation data and for controlling the generation of said select signal in accordance with the generated gradation pattern.

3. A display control device for use with a color CRT display and a color flat-panel display device which has $2^m$ gradations for each of colors R, G, and B, comprising:

color table means having a plurality of color registers for holding R, G, B color data for said color CRT display, one of said plurality of color registers being selected by display data having a color information;

means connected to said color table means for converting said R, G, B color data from said color table means into analog color video signals and for supplying the converted analog color video signals to said color CRT display; and video data forming means connected to said color table means for receiving said R, G, B color data each consisting of n bits (n>m) and held by the selected register of the color table means and for forming R, G, B color video data based on the received color data, said color video data being supplied to said color flat panel display device; each of said video data forming means comprising:

means connected to said color table means for adding a predetermined value to first color data represented by the high-order m-bits of the color data for the corresponding color consisting of n bits (n>m) and held in the selected register of the color table means so as to form second color data;

select means connected to said color flat panel display device for selecting one of said first and second color data in accordance with a select signal indicating selection of said first or second color data for each of a plurality of dots constituting one pixel of said color flat panel display device and for supplying the selected color data to said color flat panel display device; and select signal generating means connected to said color table means for generating said select signals each indicating the assignment of said first or second color data for said plurality of dots in accordance with the value of the low order (n-m) bits of the color data consisting of n bits (n>m).

4. The display control device according to claim 3, wherein said select signal generating means comprises means connected to said color table means for selectively generating $2^{(n-m)}$ different gradation patterns each indicating the assignment of the first or second color data for said plurality of dots in accordance with the value of the low-order (n-m) bits of the color data consisting of n bits (n>m) and for controlling the generation of the select signal in accordance with the generated gradation pattern.

5. A display control device, comprising:

color table means having a plurality of color registers for holding R, G, B color data for a color CRT display, one of said plurality of color registers being selected by display data having color information;

means connected to said color table means for converting said R, G, B color data output from said color table means into analog color video signals and for supplying the converted analog color video signals to said color CRT display;

summing-colors-to-gray scale means for converting an intensity value found for each of the color data R, G, B written into the selected color register of the color table means into its corresponding gray scale value having a plurality of bits; and conversion table means connected to said summing-colors-to-gray-scale means for converting the gray scale value converted by said summing-colors-to-gray-scale means into gradation data having fewer bits than that of the gray scale value and for supplying the gradation data to a flat panel display device, wherein said conversion table means comprises:

a conversion table having a plurality of registers for holding gradation data of predetermined bits; and means for selectively outputting the gradation data stored in one of the registers of the conversion table in accordance with said gray scale value.

6. The display control device according to claim 5, wherein said conversion table means comprises a writable memory for holding the gradation data of the predetermined bits and means for means for changing the gradation data in the writable memory.

7. A display control device, comprising:

color table means having a plurality of color registers for holding R, G, B color data for a color CRT display, one of said plurality of color registers being selected by display data having color information;

means connected to said color table means for converting said R, G, B color data output from said color table means into analog color video signals and for supplying the converted analog color video signal to said color CRT display;

summing-colors-to-gray scale means for converting an intensity value found for each of the color data R, G, B written into the selected color register of the color table means into its corresponding gray scale value, the summing-colors-to-gray-scale means comprising means for multiplying constants 0.30, 0.59, and 0.11 by R-data, G-data and B-data, respectively, representing the data output from said color table means, and for adding the multiplied results to obtain a combined gray scale value having a plurality of bits; and conversion table means connected to said summing-colors-to-gray-scale means for converting the combined gray scale value converted by said summing-color-to-gray-scale means into gradation data having fewer bits than those of the combined gray scale value and for supplying the gradation data to a flat panel display device.

* * * * *